(12) United States Patent  
Ishikawa et al.

(10) Patent No.: US 9,118,848 B2
(45) Date of Patent: Aug. 25, 2015

(54) IMAGE DATA COMBINING APPARATUS AND METHOD

(75) Inventors: Hisashi Ishikawa, Urayasu (JP); Yoshinari Ikegami, Kawagoe (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/462,048

(22) Filed: May 2, 2012

(65) Prior Publication Data

US 2012/0219237 A1 Aug. 30, 2012

Related U.S. Application Data

(63) Continuation of application No. 12/108,582, filed on Apr. 24, 2008, now Pat. No. 8,194,279.

(30) Foreign Application Priority Data

Apr. 26, 2007 (JP) ................. 2007-117561

(51) Int. Cl.
*G06F 3/12* (2006.01)
*G06K 15/10* (2006.01)
*H04N 1/04* (2006.01)
*H04N 5/335* (2011.01)
*H04N 1/32* (2006.01)
*H04N 1/193* (2006.01)

(52) U.S. Cl.
CPC ....... *H04N 1/32358* (2013.01); *H04N 1/32443* (2013.01); *H04N 1/32475* (2013.01); *H04N 1/193* (2013.01); *H04N 2201/0081* (2013.01); *H04N 2201/0082* (2013.01); *H04N 2201/0091* (2013.01); *H04N 2201/3294* (2013.01)

(58) Field of Classification Search
USPC .............. 358/1.5, 1.15, 1.18; 348/324, 229.1, 348/234; 347/247, 41, 12, 40
See application file for complete search history.

(56) References Cited

U.S. PATENT DOCUMENTS

| | | | | |
|---|---|---|---|---|
| 5,402,155 | A | * | 3/1995 | Hatayama et al. ............. 347/247 |
| 5,535,007 | A | * | 7/1996 | Kim ............................... 358/296 |
| 5,608,881 | A | * | 3/1997 | Masumura et al. ........... 710/310 |
| 6,322,197 | B1 | * | 11/2001 | Yanaka ............................ 347/41 |
| 6,593,968 | B1 | * | 7/2003 | Ichikawa ...................... 348/324 |
| 6,683,703 | B1 | | 1/2004 | Iwai |
| 6,717,617 | B1 | * | 4/2004 | Ozono ........................... 348/324 |
| 6,765,703 | B1 | | 7/2004 | Watanabe |

(Continued)

FOREIGN PATENT DOCUMENTS

| | | |
|---|---|---|
| JP | 2006-139606 A | 6/2006 |
| JP | 2006139606 A * | 6/2006 |

*Primary Examiner* — Akwasi M Sarpong
(74) *Attorney, Agent, or Firm* — Fitzpatrick, Cella, Harper & Scinto

(57) ABSTRACT

An image data combining apparatus combines m lines (m is an integer equal to or greater than 2) of pixel data that have been output from a reading unit. An access unit accesses a memory. A determination unit determines an upper address used for accessing the memory, based upon first data that relates a position, along a height direction, of the m lines of stored pixel data, and determines a lower address used for accessing the memory by the access unit, based upon second data that relates a position of the width direction in the m lines of stored pixel data. The lower address includes values in which a portion of a plurality of bits constituting the second data are interchanged. P items (an integer equal to or greater than 1) of pixel data output from each of the m lines of pixel data are successively extracted from the memory.

26 Claims, 21 Drawing Sheets

(56) References Cited

U.S. PATENT DOCUMENTS

| | | |
|---|---|---|
| 6,825,949 B1 | 11/2004 | Hirai |
| 6,950,559 B2 * | 9/2005 | Kobayashi .................... 382/260 |
| 7,046,402 B2 | 5/2006 | Watanabe |
| 7,580,151 B2 * | 8/2009 | Kurose et al. .................. 358/1.9 |
| 2001/0028466 A1 * | 10/2001 | Kobayashi ..................... 358/1.9 |
| 2002/0067505 A1 * | 6/2002 | Ogushi ......................... 358/1.15 |
| 2004/0036894 A1 * | 2/2004 | Murata ........................... 358/1.5 |

* cited by examiner

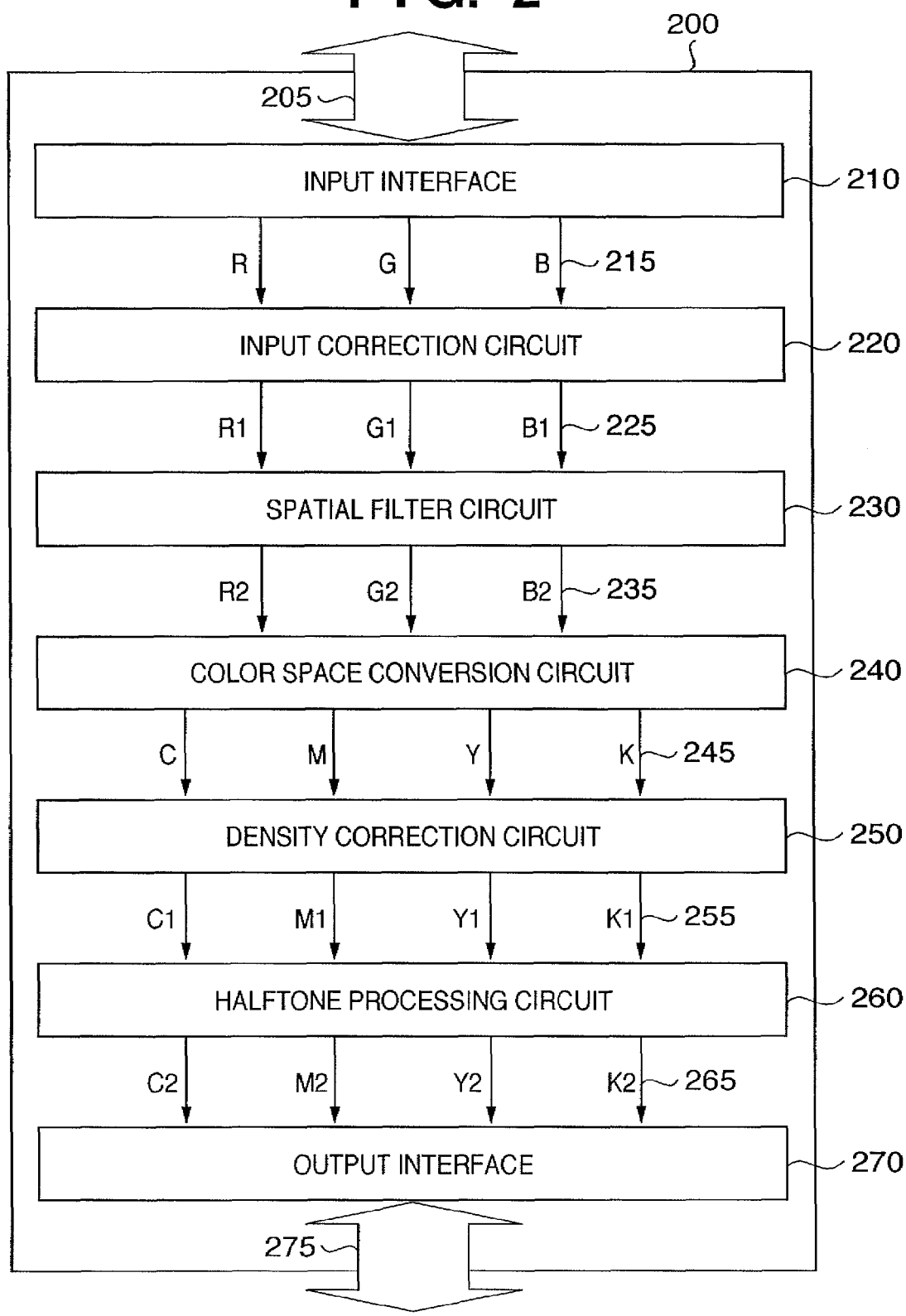

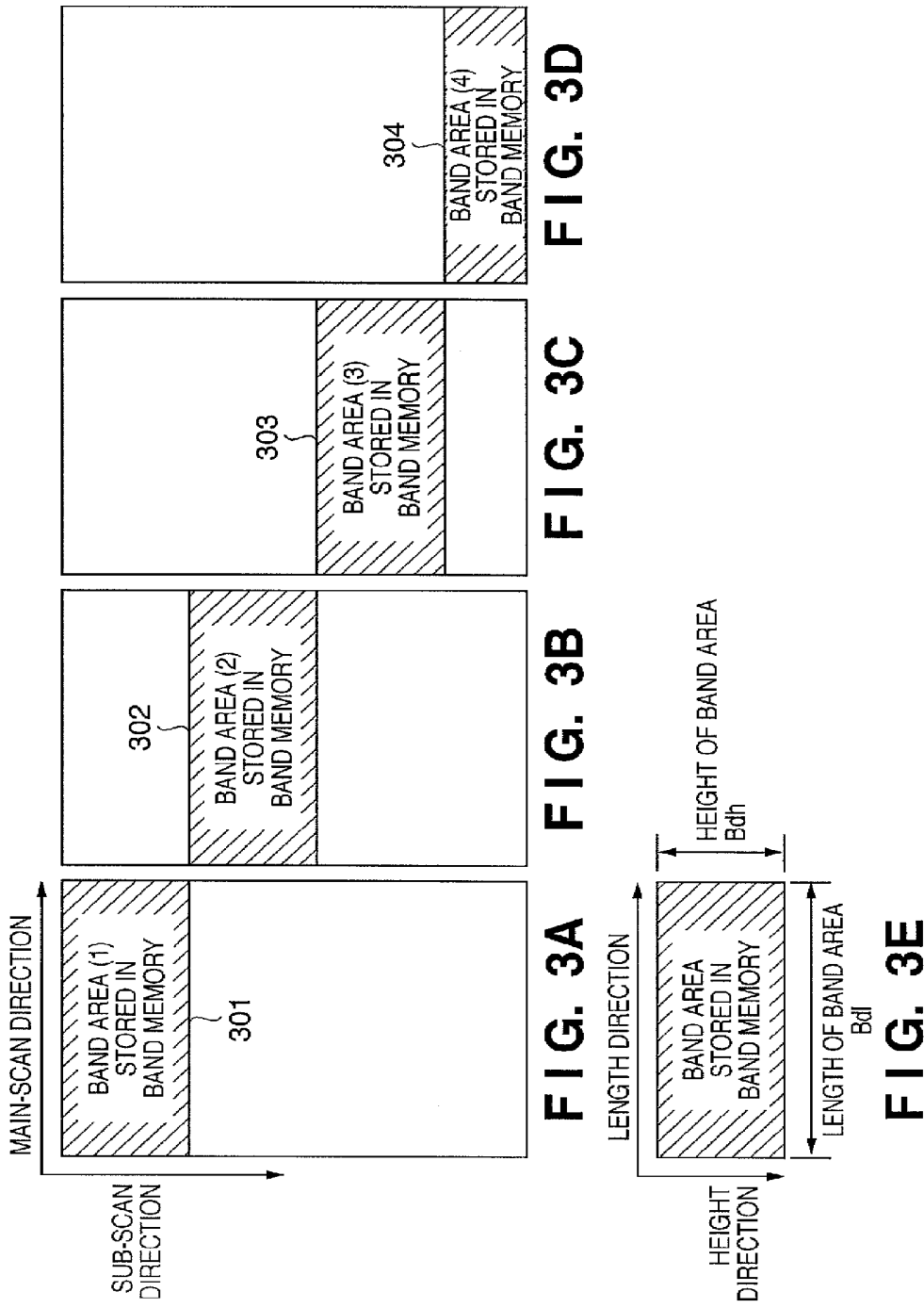

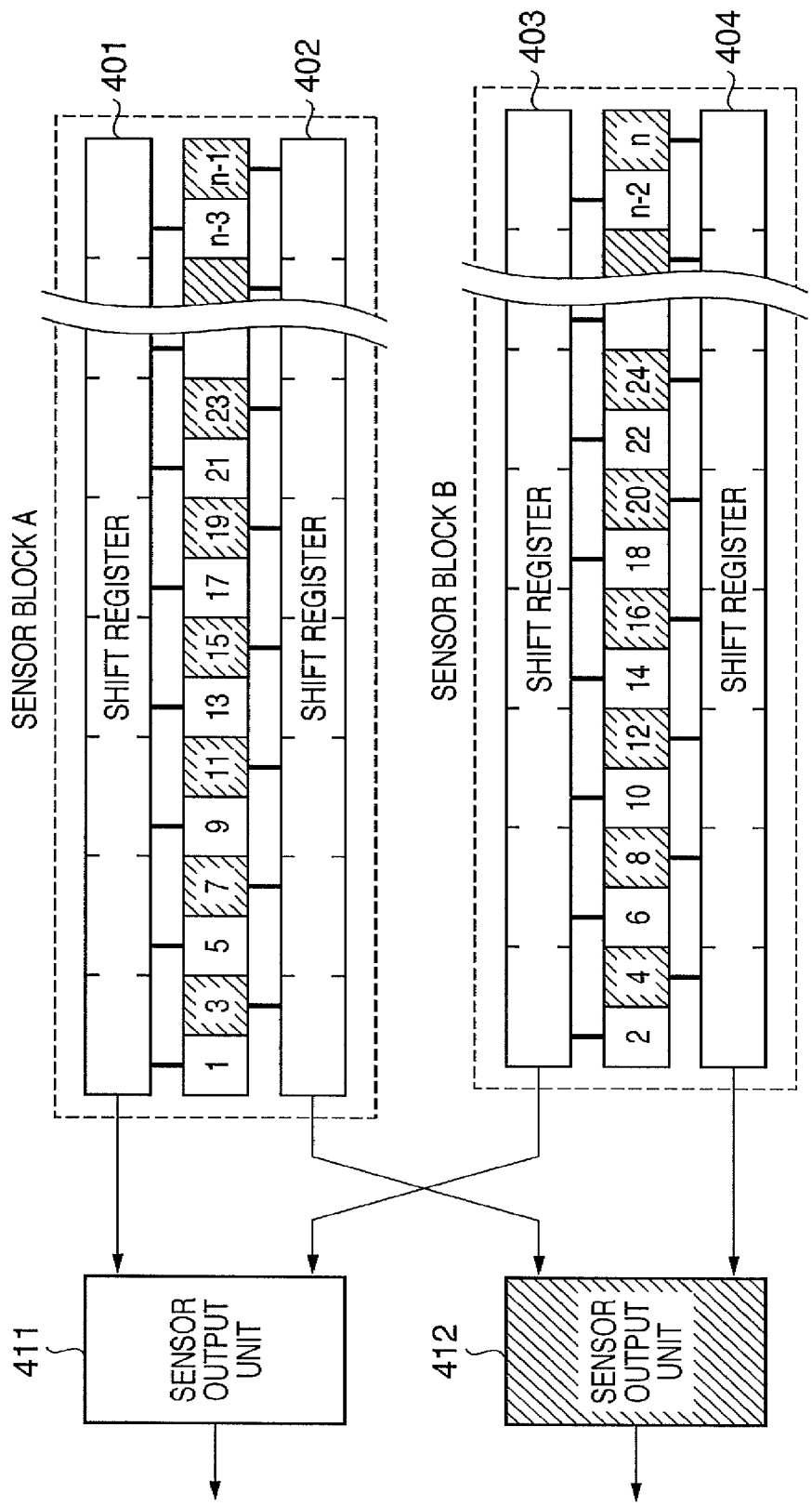

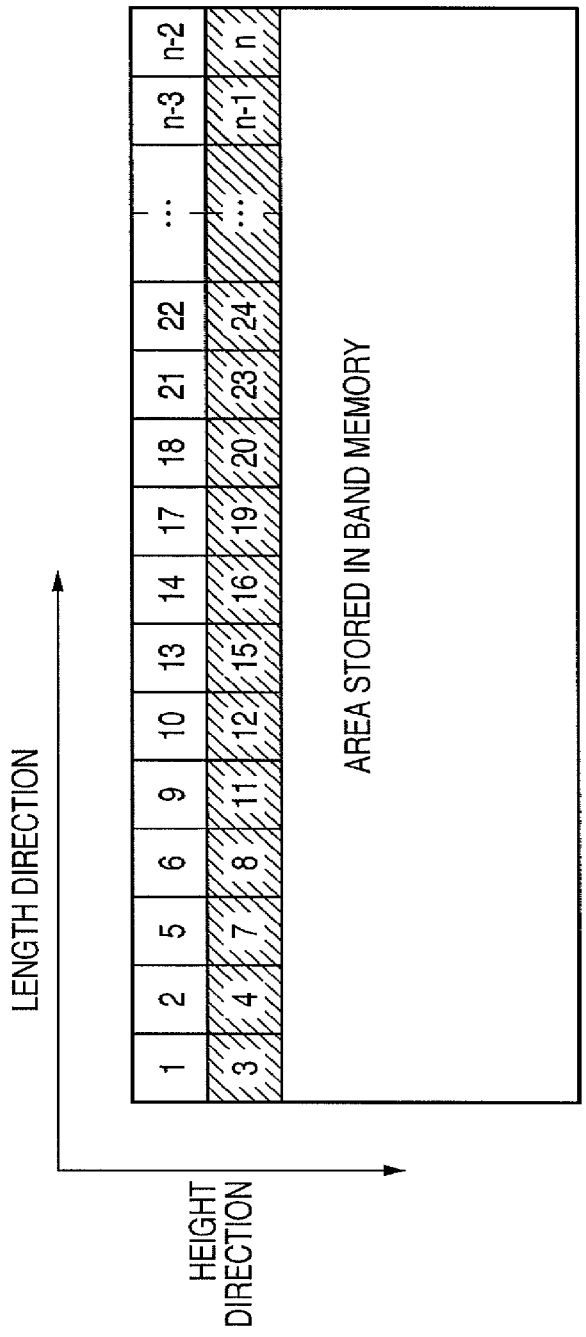

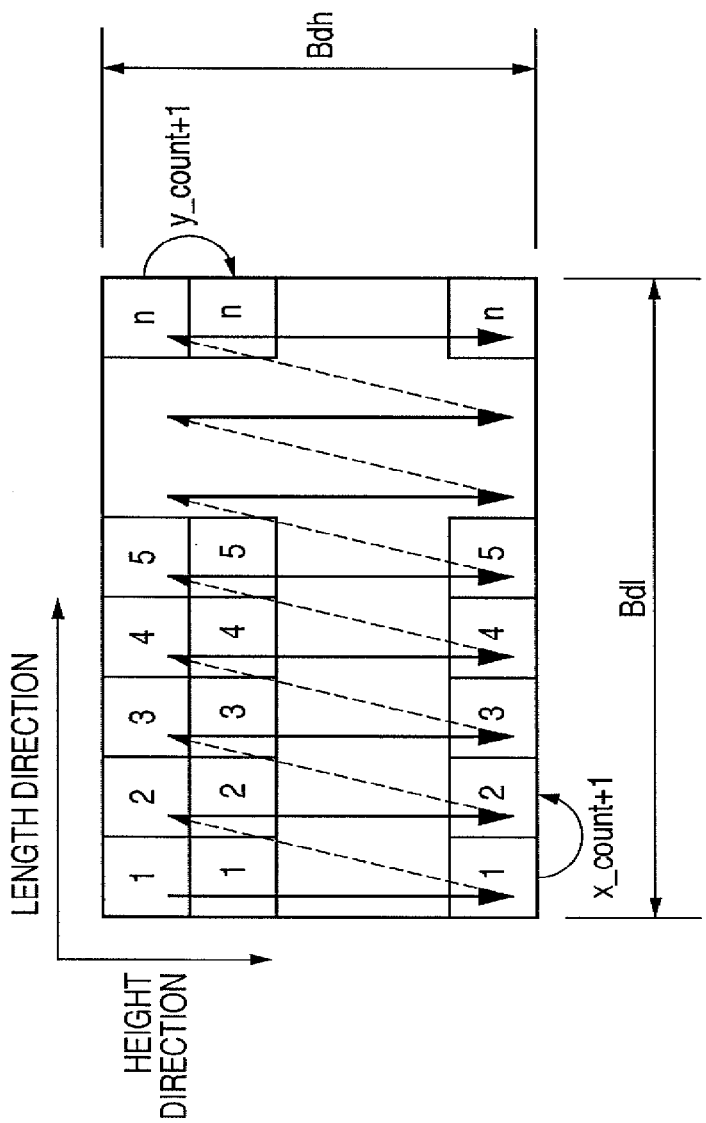

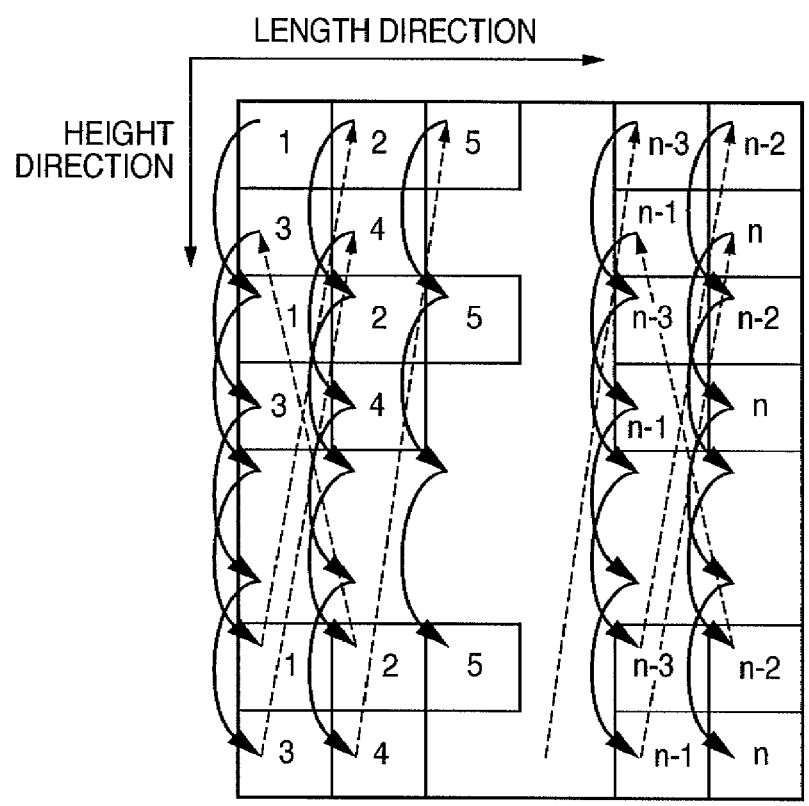
F I G. 8C

F I G. 10A

| 1 | 2 | 3 | 4 | 5 | 6 | 7 | ... |
|---|---|---|---|---|---|---|-----|
| 1 | 2 | 3 | 4 | 5 | 6 | 7 | ... |

F I G. 10B

| 1 | 3 | 5 | 7 | 9 | 11 | 13 | ... |
|---|---|---|---|---|----|----|-----|
| 2 | 4 | 6 | 8 | 10 | 12 | 14 | ... |

F I G. 10C

| 1 | 2 | 5 | 6 | 9 | 10 | 13 | ... |
|---|---|---|---|---|----|----|-----|
| 3 | 4 | 7 | 8 | 11 | 12 | 15 | ... |

F I G. 10D

| 1 | 5 | 9 | 13 | 17 | 21 | 25 | ... |
|---|---|---|----|----|----|----|-----|
| 2 | 6 | 10 | 14 | 18 | 22 | 26 | ... |
| 3 | 7 | 11 | 15 | 19 | 23 | 27 | ... |
| 4 | 8 | 12 | 16 | 20 | 24 | 28 | ... |

F I G. 10E

| 1 | 2 | 9 | 10 | 17 | 18 | 25 | ... |
|---|---|---|----|----|----|----|-----|
| 3 | 4 | 11 | 12 | 19 | 20 | 27 | ... |
| 5 | 6 | 13 | 14 | 21 | 22 | 29 | ... |
| 7 | 8 | 15 | 16 | 23 | 24 | 31 | ... | read_addr [12:0]

F I G. 12A

| 2 | 4 | 6 | 8 | 10 | 12 | 14 | ... |
|---|---|---|---|----|----|----|-----|
| 1 | 3 | 5 | 7 | 9  | 11 | 13 | ... |

F I G. 12B

| 3 | 4 | 7 | 8 | 11 | 12 | 15 | ... |
|---|---|---|---|----|----|----|-----|
| 1 | 2 | 5 | 6 | 9  | 10 | 13 | ... |

F I G. 12C

| 3 | 7 | 11 | 15 | 19 | 23 | 27 | ... |
|---|---|----|----|----|----|----|-----|
| 4 | 8 | 12 | 16 | 20 | 24 | 28 | ... |
| 1 | 5 | 9  | 13 | 17 | 21 | 25 | ... |
| 2 | 6 | 10 | 14 | 18 | 22 | 26 | ... |

F I G. 12D

| 5 | 6 | 13 | 14 | 21 | 22 | 29 | ... |
|---|---|----|----|----|----|----|-----|
| 7 | 8 | 15 | 16 | 23 | 24 | 31 | ... |
| 1 | 2 | 9  | 10 | 17 | 18 | 25 | ... |
| 3 | 4 | 11 | 12 | 19 | 20 | 27 | ... |

IMAGE DATA COMBINING APPARATUS AND METHOD

RELATED APPLICATIONS

This application is a continuation of application Ser. No. 12/108,582, filed Apr. 24, 2008. It claims benefit of that application under 35 U.S.C. §120, and claims benefit under 35 U.S.C. §119 of Japanese Patent Application No. 2007-117561, filed Apr. 26, 2007. The entire contents of each of the mentioned prior applications are incorporated herein by reference.

BACKGROUND OF THE INVENTION

1. Field of the Invention

The present invention relates to an image data combining apparatus for combining a plurality of lines of image data that have been output from a reading unit.

2. Description of Related Art

A known method of obtaining image data by reading a document image or the like is to read the image using a line sensor, store the read data in a line memory and subject the data to image processing (e.g., see the specification of U.S. Pat. No. 6,765,703).

Another method known in the art involves dividing sensor pixels, which have been formed on one line, into even- and odd-numbered rows, outputting data, rearranging within the sensor and executing processing of the data as one line of data (e.g., see the specification of U.S. Pat. No. 6,717,617). Thus dividing one line of data from a line sensor and reading out data as a plurality of lines is referred to as "divided readout". The reason for performing divided readout is to reduce the number of transferred pixels of the line sensor when image data per line is read out, thereby raising readout speed.

In another known arrangement, image data read by scanning a line sensor in the direction in which sensor elements are arrayed (the main-scan direction) is stored in a memory (a band memory) in plural-line units (band units), and the data is then subjected to image processing. Corresponding two-dimensional image portions are developed in the band memory.

Further, the specification of Japanese Patent Laid-Open No. 2006-139606 describes a method of scanning such a band memory in a direction (sub-scan direction) perpendicular to the line, reading out pixel data and executing image processing.

However, in order to deal with the recent demand for higher definition of read images, the number of sensor elements required on one line is increasing and so is the required capacity of the line memory. With the conventional method of using a line memory, apparatus cost rises and the structure of the apparatus is made more complicated by increasing the semiconductor chips used. Further, in the case of the arrangement in which pixels are arrayed in a row within the sensor, as in U.S. Pat. No. 6,717,617, the scale of the sensor itself increases and it is difficult to reduce the size of the apparatus.

SUMMARY OF THE INVENTION

An object of the present invention is to combine m lines of image data, which have been output from a reading unit, by a simple arrangement.

Another object of the present invention is to provide an image data combining apparatus for combining m lines (where m is an integer equal to or greater than 2) of image data that have been output from a reading unit, where the reading unit has a plurality of line sensors arranged in parallel, each of the plurality of line sensors outputs pixel data upon dividing the data into a plurality of lines, the reading unit outputs m lines of image data based upon the pixel data that has been output upon being divided into the plurality of lines, and the output m lines of image data are stored in a memory. The apparatus comprises an access unit configured to access the memory, and a determination unit configured to determine an upper address used for accessing the memory by the access unit, based upon first data that indicates position, along the sub-scan direction, of an image that has been read by the reading unit, and determine a lower address used for accessing the memory by the access unit, based upon second data that indicates position of the image along the main-scan direction. The lower address includes values in which the sequence of a plurality of bits constituting the second data is interchanged in such a manner that p items (where p is an integer equal to or greater than 1) of pixel data at a time are extracted successively from each of the m lines of image data.

Further features of the present invention will become apparent from the following description of exemplary embodiments with reference to the attached drawings.

BRIEF DESCRIPTION OF THE DRAWINGS

FIG. 2 is a block diagram illustrating an example of the circuit configuration of an image processing controller in an image processing unit according to the first embodiment;

FIGS. 3A to 3E are diagrams illustrating an example of operation of band processing according to the embodiment;

FIG. 4A is a diagram illustrating an example of the structure of a CCD sensor according to the first embodiment;

FIG. 4B is a diagram illustrating a state in which pixel data that has been output by the arrangement of FIG. 4A has been stored in a band memory;

FIG. 7B is a diagram useful in describing the pixel readout operation of FIG. 7A;

FIG. 8C is a diagram illustrating how the readout operation of FIG. 7B is converted by the array conversion operation of FIG. 8A;

FIGS. 10A to 10E are diagrams illustrating arrays of image data in a band memory by various CCD sensor structures;

FIGS. 12A to 12D are diagrams useful in describing arrangement of pixel data in a band memory in a case where a phase shift has occurred between shift registers, as well as sequence of readout from the band memory.

DESCRIPTION OF THE EMBODIMENTS

Preferred embodiments of the present invention will now be described with reference to the accompanying drawings.

First Embodiment

Figure 1:
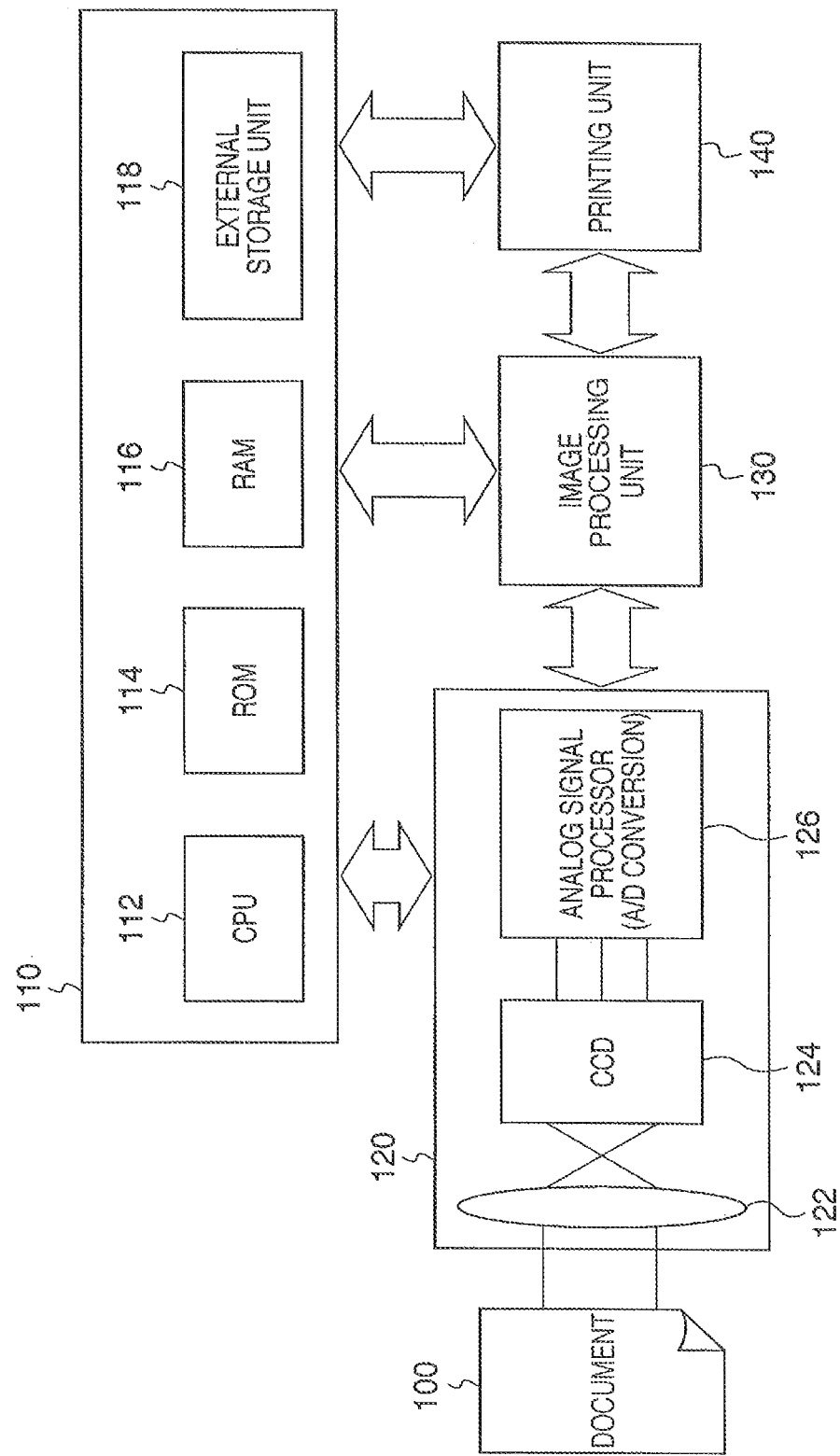
FIG. 1 is a block diagram illustrating an example of the overall configuration of an image processing apparatus according to a first embodiment of the present invention.

Reference will be had to the block diagram of FIG. 1 to describe the configurations of an image reading unit, an image processing unit and an image output unit according to the first embodiment. The image reading unit, image processing unit and image output unit may be implemented as respective separate units or as an apparatus in which any or all of these units are integrated. The image reading unit may be a scanner or as an image sensing unit such as a digital camera or digital video camera. The image output unit may be a printing unit such as a printer or a display unit such as a display monitor. In a case where the image reading unit, image processing unit and image output unit are each constructed as separate units, the units are connected via a local-area network (LAN), etc., so as to be capable of communicating with one another.

As shown in FIG. 1, an image reading unit 120, an image processing unit 130 and an image output unit (printer unit) 140 are integrated via a CPU circuit 110.

In FIG. 1, the image reading unit 120 is composed of a CCD sensor 124 and an analog signal processor 126, etc. An image of a document 100 that has been formed on the CCD sensor 124 via a lens 122 is converted to analog electric signals of the colors R (Red), G (Green) and B (Blue) by the CCD sensor 124. The image information that has been converted to these analog electric signals is input to the analog signal processor 126 where it is subjected to an analog/digital (A/D) conversion after a correction is applied to each of the colors R, G, B. The full-color signal (referred to as a "digital image signal" below) thus digitized is input to the image processing unit 130.

The image processing unit 130 applies image processing to the digital image signal supplied from the image reading unit 120 (analog signal processor 126) and sends the processed digital image signal to the printing unit 140. It should be noted that the processing implemented by the image processing unit 130 is input correction processing, spatial filter processing, color space conversion, density correction processing and halftone processing, described later. The printing unit 140 is constituted by a printing output unit (not shown) that uses an ink jet head or thermal head. The printing unit 140 forms a visible image on printing paper in accordance with the digital image signal supplied from the image processing unit 130.

The CPU circuit 110 has a CPU 112 for controlling computations, a ROM 114 storing fixed data and programs, and a RAM 116 used to store data temporarily and to load programs. The CPU circuit 110 controls the image reading unit 120, image processing unit 130 and printing unit 140, etc., and exercises overall control of the operating sequence of the apparatus. An external storage unit 118 is a medium such as a disk for storing parameters and programs used by the apparatus. Data and programs in the RAM 116 are loaded from the external storage unit 118.

The image processing unit 130 will now be described in detail. FIG. 2 is a block diagram illustrating an example of the configuration of an image processing controller 200 possessed by the image processing unit 130 according to the first embodiment. The digital image signal from the analog signal processor 126 of the image reading unit 120 is input to the image processing controller 200 via a bus 205. The image processing controller 200 comprises an input interface 210, an input correction circuit 220, a spatial filter circuit 230, a color space conversion circuit 240, a density correction circuit 250, a halftone processing circuit 260 and an output interface 270. The input correction circuit 220, spatial filter circuit 230, color space conversion circuit 240, density correction circuit 250 and halftone processing circuit 260 will be described in detail below.

[Input correction circuit 220] A digital image signal 215 is input to the input correction circuit 220 via the input interface 210. The digital image signal 215 is composed of R, G, B luminance signals. The input correction circuit 220 executes pixel rearrangement processing (described later) for every color (R, G, B) of the digital image signal 215 and executes processing that corrects for variation in the sensor that reads the document and corrects the luminous intensity distribution of a document illuminating lamp.

[Spatial filter circuit 230] A digital image signal 225 (luminance signals R1, G1, B1) that is output from the input correction circuit 220 is input to the spatial filter circuit 230. The latter subjects the entered digital image signal 225 to local (nearby) image processing such as smoothing and edge emphasis.

[Color space conversion circuit 240] A digital image signal 235 (luminance signals R2, G2, B2) that is output from the spatial filter circuit 230 is input to the color space conversion circuit 240. The latter converts the luminance signals (digital image signal 235) of RGB color space to density signals of CMYK color space.

[Density correction circuit 250] A digital image signal 245 (density signals C, M, Y, K) that is output from the color space conversion circuit 240 is input to the density correction circuit 250. The latter subjects the digital image signal 245 to an output-engine γ correction (density correction). In general, the input density of the halftone processing circuit 260, which is the next stage, does not agree with the output density of the output engine of the printing unit 140 owing to dot gain, etc. (the input and output are non-linear). Accordingly, in order to so arrange it that a linear output conforming to input density is obtained, the input/output density characteristic from the halftone processing circuit 260 onward is corrected in advance by the γ correction.

[Halftone processing circuit 260] A digital image signal 255 (density signals C1, M1, Y1, K1) that is output from the density correction circuit 250 is input to the halftone processing circuit 260. The latter subjects the digital image signal 255 to halftone processing such as screen processing and error-diffusion processing and converts the signal to binary halftone representation. A binary digital image signal 265 (print signals C2, M2, Y2, K2) obtained by the halftone processing circuit 260 is output to the printing unit 140 via the output interface 270 and a bus 275.

Next, band processing used in the first embodiment will be described. In band processing, one page of image data is divided into a plurality of bands, the band areas are sequentially assigned to a band memory and a conversion is made to image data within the band areas.

In a low-cost device such as a household printer, there are many cases where the capacity of the line memory (which corresponds to the RAM 116 in FIG. 1) of the system is so small that the entirety of the digital image data on one page cannot be stored in the line memory. For this reason, the entirety of the digital image data on one page is divided into bands (rectangular strips), as illustrated in FIGS. 3A to 3D, only these areas are developed sequentially in the main memory and then various image processing is executed. Each long and narrow area thus obtained by division is referred to as a "band area", the storage area in which the band area is developed is referred to as a "band buffer" or "band memory", and the act of dividing data into band areas is referred to as "band division". The band memory stores several lines of pixel data, which have been predetermined, from the image reading unit 120. The band memory is not necessarily reserved in the storage area of the main memory and may be reserved in any storage area in the system. In the first embodiment, it will be assumed that the band memory is reserved in the main memory in order to simplify the description. Further, separate from the coordinate system (main-scan direction vs. sub-scan direction) of the digital image data, a new coordinate system (band area coordinate system) of length direction vs. height direction, as shown in FIG. 3E, is defined, and the band area is expressed by length (Bdl)×height (Bdh).

Band processing will now be described in somewhat more detail. First, a band area 301 shown in FIG. 3A is developed in the band memory of the main memory and image processing is executed. Next, a band area 302 shown in FIG. 3B is developed by being written over the band memory in which the band area 301 was developed, and image processing is executed. Next, a band area 303 shown in FIG. 3C is developed by being written over the band memory in which the band area 302 was developed, and image processing is executed. Finally, a band area 304 shown in FIG. 3D is developed by being written over the band memory in which the band area 303 was developed, and image processing is executed. It is evident from FIGS. 3A to 3D that the band areas have identical lengths but need not have identical heights. The band memory, which is the storage area in the main memory, is decided by the band area of the largest size (band areas 301 to 303 in the case of FIGS. 3A to 3D).

Further, the band memory in the main memory is not necessarily limited to a single storage area, as described above. For example, it may be so arranged that a plurality of band memories are reserved in the main memory and image processing is executed in pipeline fashion. By way of example, two band areas A and B are provided, band area 301 is developed in band memory A and image processing (A) is executed. Next, the band area 301 is shifted from band memory A to band memory B and the band area 302 is developed in band memory A. Then, while image processing (B) is applied to the band area 301 in band memory B, image processing (A) is applied concurrently to the band area 302 in band memory B. Thus, pipeline image processing becomes possible by dividing digital image data into individual band areas and then executing image processing.

The image reading unit 120 of this embodiment will be described next. The image reading unit 120 has a line sensor (the CCD sensor 124 in this embodiment) in which a plurality of image sensors (sensor elements) are arrayed in line form. The CCD sensor 124 produces an output in a form in which one line of image data has been divided into a plurality of lines. The direction in which the sensor elements are arrayed in the line sensor shall be referred to as the "line direction".

For example, FIG. 4A is a diagram illustrating an example of the structure of the CCD sensor 124 for one color among R, G, B. In FIG. 4A, reference characters 1 to n indicate individual sensor elements. A sensor block A and a sensor block B are usually physically disposed several lines apart. For example, the CCD sensor 124 has a configuration in which N (two in FIG. 4A) line sensors are arrayed in parallel in the sub-scan direction, which is perpendicular to the line direction. If we let d represent the distance between the centers of neighboring pixels within the line sensors, then the structure will be one in which N line sensors are disposed at a pitch of $\phi=d/N$ in the line direction. It should be noted that for the purpose of simplicity in the description that follows, the physical distance between sensor blocks A and B is assumed to be zero, i.e., it is assumed that all of the sensor elements 1 to n have been arrayed on the same line. In accordance with such a CCD sensor, all of the pixel data 1 to n is acquired by a single scan in the main-scan direction.

In sensor blocks A and B, pixel data that has been read from each of the sensor elements of each block by scanning in the main-scan direction is stored in shift registers 401 to 404. The shift registers 401 and 403 are connected to a sensor output unit 411, and the shift registers 402 and 404 are connected to a sensor output unit 412. Pixel data is output successively from the sensor output units 411 and 412. At this time the sensor output unit 411 accepts alternatingly the output of the shift register 401 on the upper side of sensor block A and the output of the shift register 403 on the upper side of sensor block B and outputs the signal as one line of data. Similarly, the sensor output unit 412 accepts alternatingly the output of the shift register 402 on the lower side of sensor block A and the output of the shift register 404 on the lower side of sensor block B and outputs the signal as one line of data.

The pixel data that has been output from the sensor output unit 411 and sensor output unit 412 is converted to a digital signal by the analog signal processor 126, after which the digital signals are developed in the band memory reserved in the RAM 116, etc. The outputs of the sensor output unit 411 and sensor output unit 412 are developed in the band memory as respective single lines of data. As illustrated in FIG. 4B, therefore, data that has been output from the sensor output unit 412 is developed in the height direction of the band memory as the next line of data following the data from the sensor output unit 411.

In this embodiment, one scan of pixel data is divided into two lines and is developed in the band memory, as illustrated in FIG. 4B. This makes it necessary to rearrange pixels. That is, in a case where an attempt is made to output single lines of pixel data in order, there is need for an arrangement in which pixels are extracted from the band memory, in which the pixel data has been stored, in the order 1, 2, 3, . . . n, as illustrated in FIG. 4B. The rearranging of pixels according to this embodiment will be described below. It this embodiment, the input correction circuit 220 within the image processing unit 130 executes this rearranging of pixels.

Figure 5A:
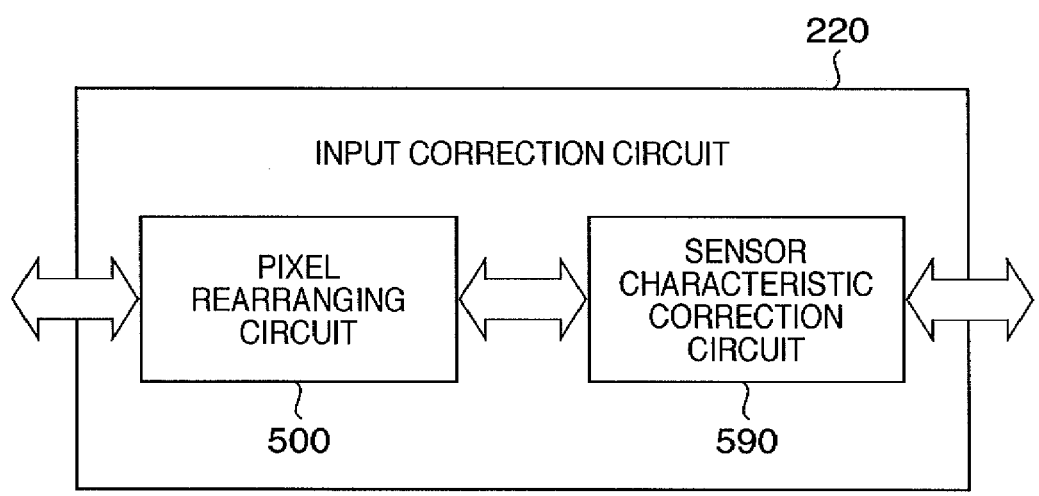
FIG. 5A is a block diagram illustrating the configuration of an input correction circuit according to the embodiment.

FIG. 5A is a block diagram illustrating the configuration of the input correction circuit 220 according to this embodiment. As illustrated in FIG. 5A, the input correction circuit 220 has a pixel rearranging circuit 500 for rearranging pixels, and a sensor characteristic correction circuit 590. The entered pixel data is supplied to the sensor characteristic correction circuit 590 after rearrangement (described later) of the pixels by the pixel rearranging circuit 500. The sensor characteristic correction circuit 590 successively processes the pixel data supplied from the pixel rearranging circuit 500 and outputs the processed data to the succeeding image processing.

Figure 5B:
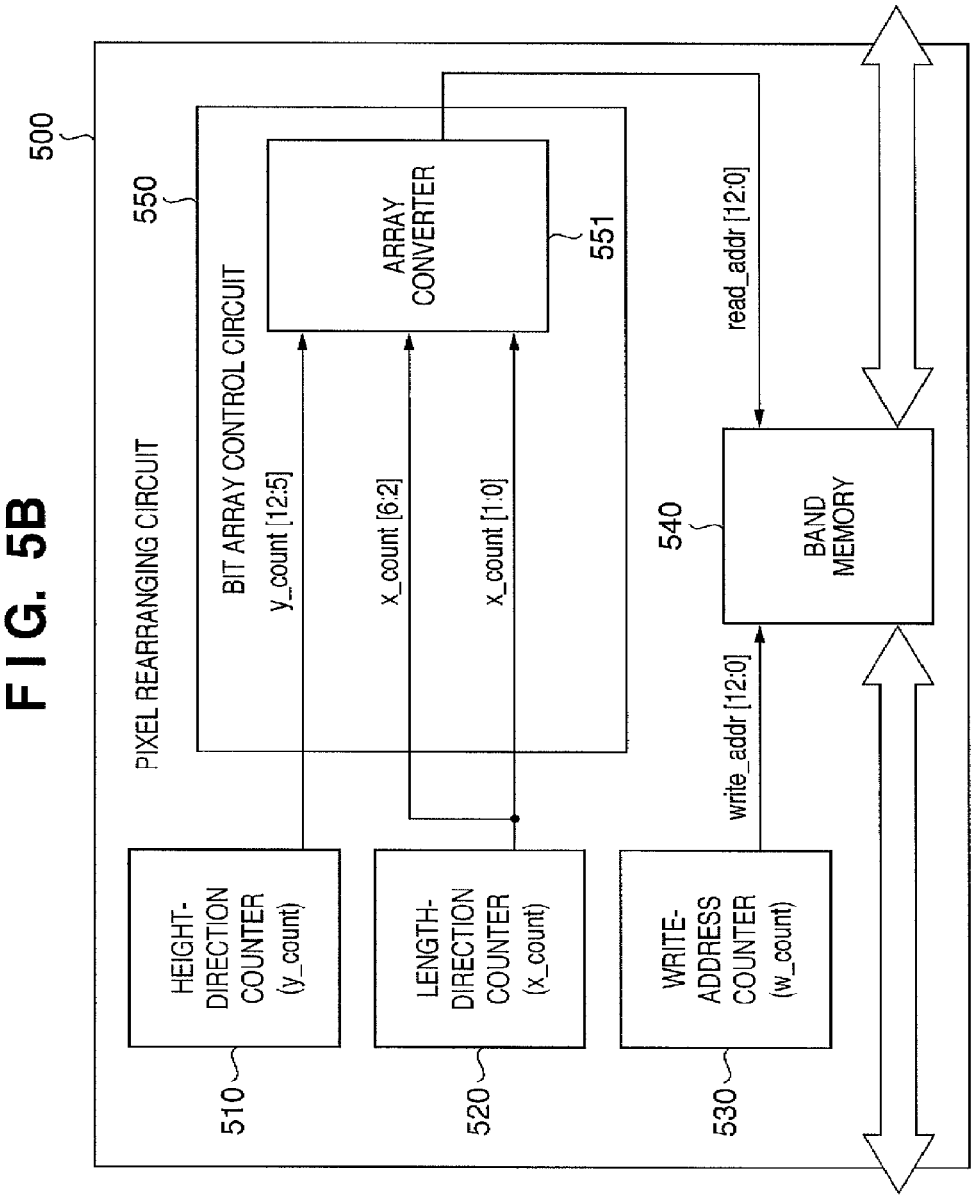
FIG. 5B is a block diagram illustrating the configuration of a pixel rearranging circuit according to the embodiment.

FIG. 5B is a block diagram illustrating the details of the configuration of the pixel rearranging circuit 500. The rearrangement of pixels by the pixel rearranging circuit 500 will now be described in detail with reference to FIG. 5B.

As illustrated in FIG. 5B, the pixel rearranging circuit 500 has a height-direction counter 510 (y_count), a length-direction counter 520 (x_count) and a write-address counter 530 (w_count). Further, the pixel rearranging circuit 500 has a band memory 540 and a bit array control circuit 550 that includes an array converter 551.

Pixel data that has been input to the pixel rearranging circuit 500 is stored in the band memory in accordance with an address (write_addr[12:01]) that is output by the write-address counter 530, and the pixel data is disposed as illustrated in FIG. 4B. When read data in an amount equivalent to the band height is stored in the band memory, a readout operation starts.

In the readout operation, a pixel position from which readout is to be performed is designated by a height-direction pixel position signal (y_count[12:5]) from the height-direction counter 510 and a length-direction pixel position signal (x_count[6:0]) from the length-direction counter 520. This pixel position indicates a pixel position in a two-dimensional image. The sequence of designation of pixel positions by the pixel position signals from the height-direction counter 510 and length-direction counter 520 is one in which successive scanning of the band memory along the length direction is repeated along the height direction, as will be described later with reference to FIGS. 6A and 6B. Alternatively, the sequence may be one in which successive scanning of the band memory along the height direction is repeated along the length direction, as will be described later with reference to FIGS. 7A and 7B.

The pixel position signals from the height-direction counter 510 and length-direction counter 520 are applied to the array converter 551, whereby the bit array is converted. This conversion processing generates a band-memory readout address (read_addr[12:0]) suited to the state of placement of the pixel data shown in FIG. 4B, by way of example. It should be noted that the band memory may be a double buffer arrangement, in which case the writing of a second band can be executed while readout of the first band is being performed. This makes it possible to raise the speed of processing.

The operation of the height-direction counter 510 and length-direction counter 520 will now be described with reference to FIGS. 6A, 6B and FIGS. 7A, 7B.

Figure 6A:
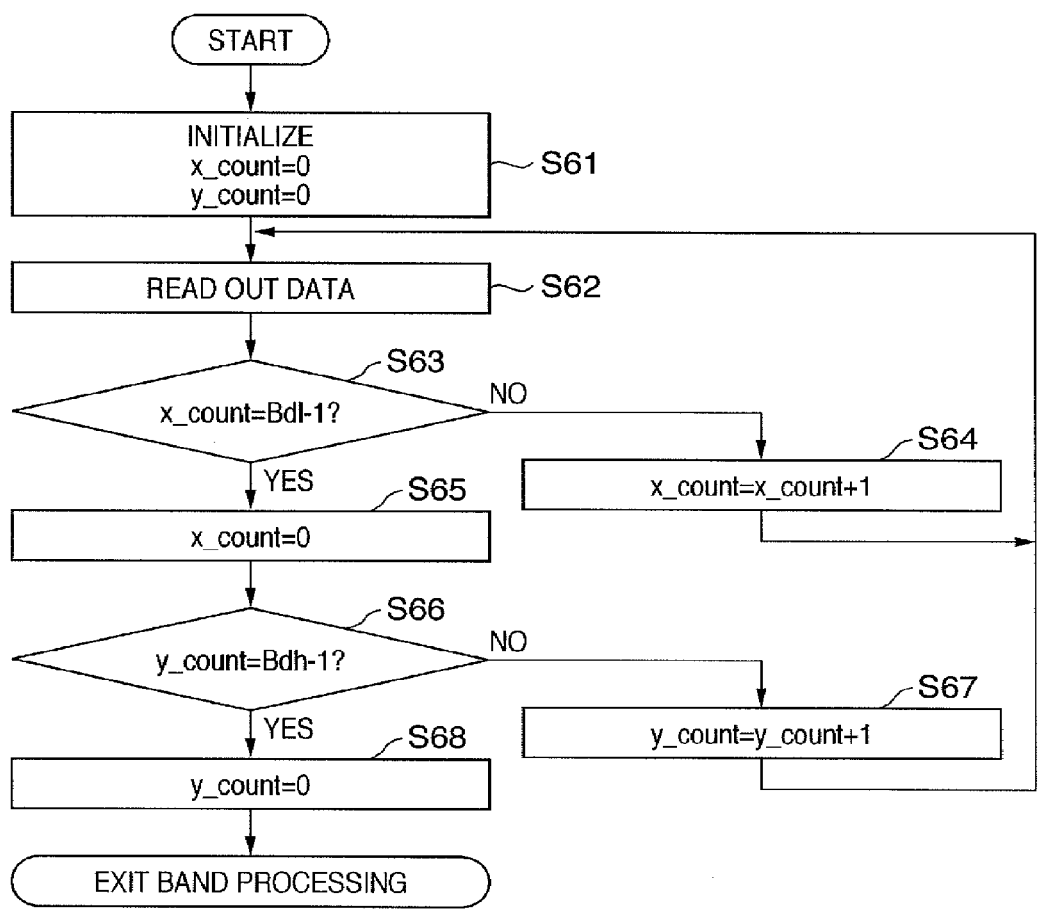
FIG. 6A is a flowchart illustrating an example of operation for pixel readout according to the first embodiment.

In a case where processing in the length direction of a band is executed first and then processing of the next line is executed sequentially in the height direction of the band, pixel data at the upper left of the band (x_count=0, y_count_=0) is read out first, as illustrated in FIG. 6A (steps S61, S62). Next, 1 is added to x_count_and, if x_count_has not reached the band length (Bdl−1), the next pixel is read out (steps S63, S64, S62). Thus, a pixel position signal for reading out pixels successively in the length direction is generated.

If x_count_has reached the band length (Bdl−1), x_count_is cleared (step S65). If y_count_has not reached the band height (Bdh−1), then 1 is added to y_count_and data at the left end of the next line is read out in the height direction (steps S66, S67, S62). Thereafter, a similar operation is repeated until x_count reaches the band length and y_count_reaches the band height, whereby readout of one band is executed. If it has been determined at step S66 that y_count_has reached the band height, then y_count_is cleared (step S68) and this processing is exited. As a result, a two-dimensional image is scanned in the manner illustrated in FIG. 6B. In this embodiment, Bdl=n holds.

Figure 7A:
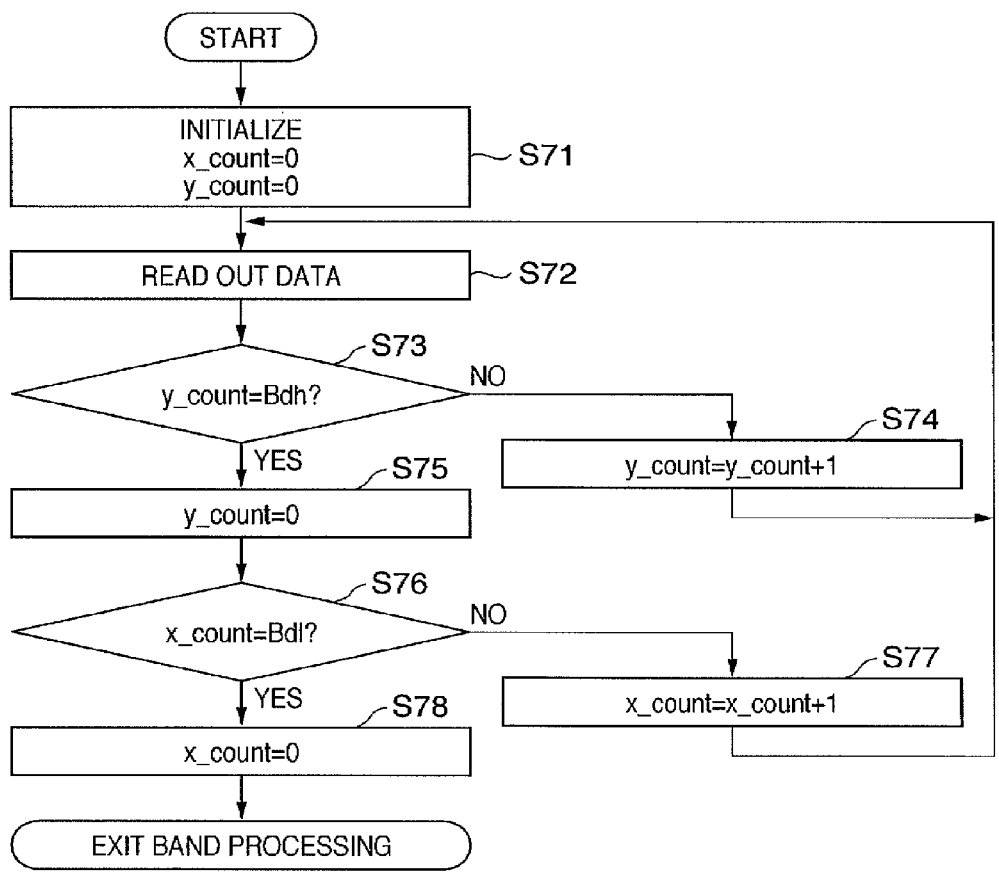
FIG. 7A is a flowchart illustrating another example of operation for pixel readout according to the first embodiment.

Described next will be a case where processing in the height direction of a band is executed first and then processing of the next pixel is executed sequentially in the length direction of the band. In this case, pixel data at the upper left of the band (x_count=0, y_count__=0) is read out first, as illustrated in FIGS. 7A, 7B (steps S71, S72). Next, if y_count_has not reached the band height (Bdh−1), then 1 is added to y_count_and the next line is read out in the height direction (steps S73, S74, S72). Thus, a pixel position signal for reading out pixels successively in the height direction is generated.

If y_count_has reached the band height (Bdh−1), y_count_is cleared (step S75). If x_count_has not reached the band length (Bdl−1), then 1 is added to x_count_and data at the upper end of the next pixel is read out in the length direction (steps S76, S77, S72). Thereafter, a similar operation is repeated until y_count_reaches the band height and x_count_reaches the band length, whereby readout of one band is executed. If it has been determined at step S76 that x_count_has reached the band length, then x_count_is cleared (step S78) and this processing is exited. Thus, a two-dimensional image is scanned in the manner illustrated in FIG. 7B.

Figure 6B:
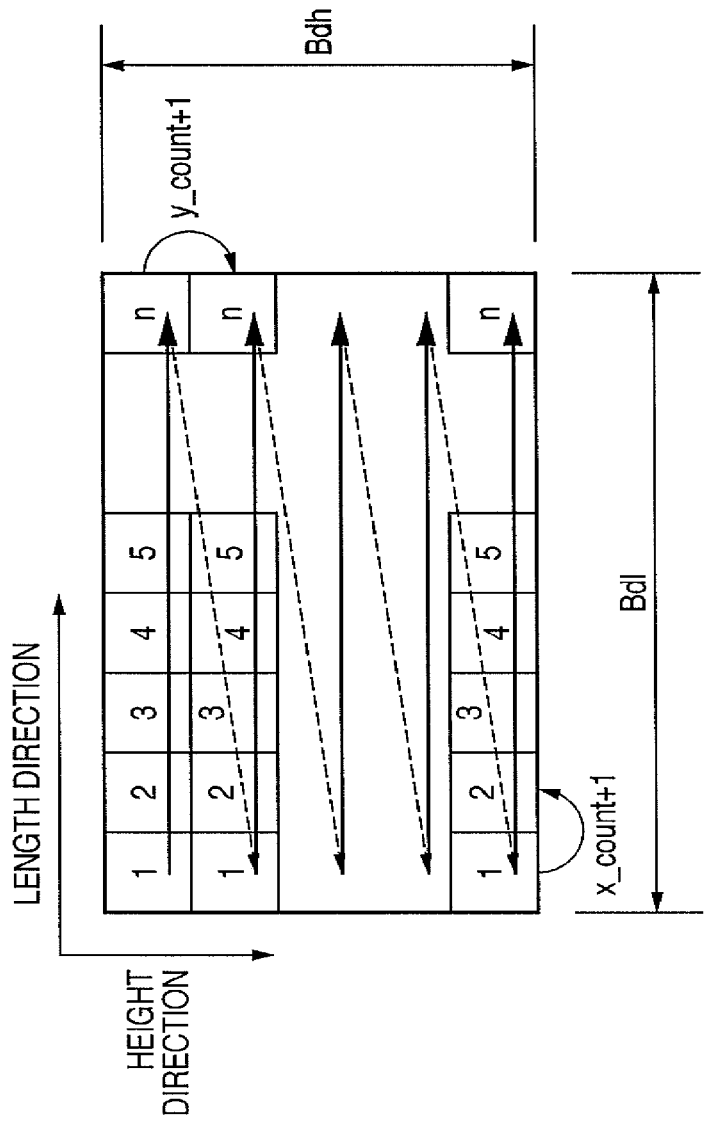
FIG. 6B is a diagram useful in describing the pixel readout operation of FIG. 6A.
Figure 8A:
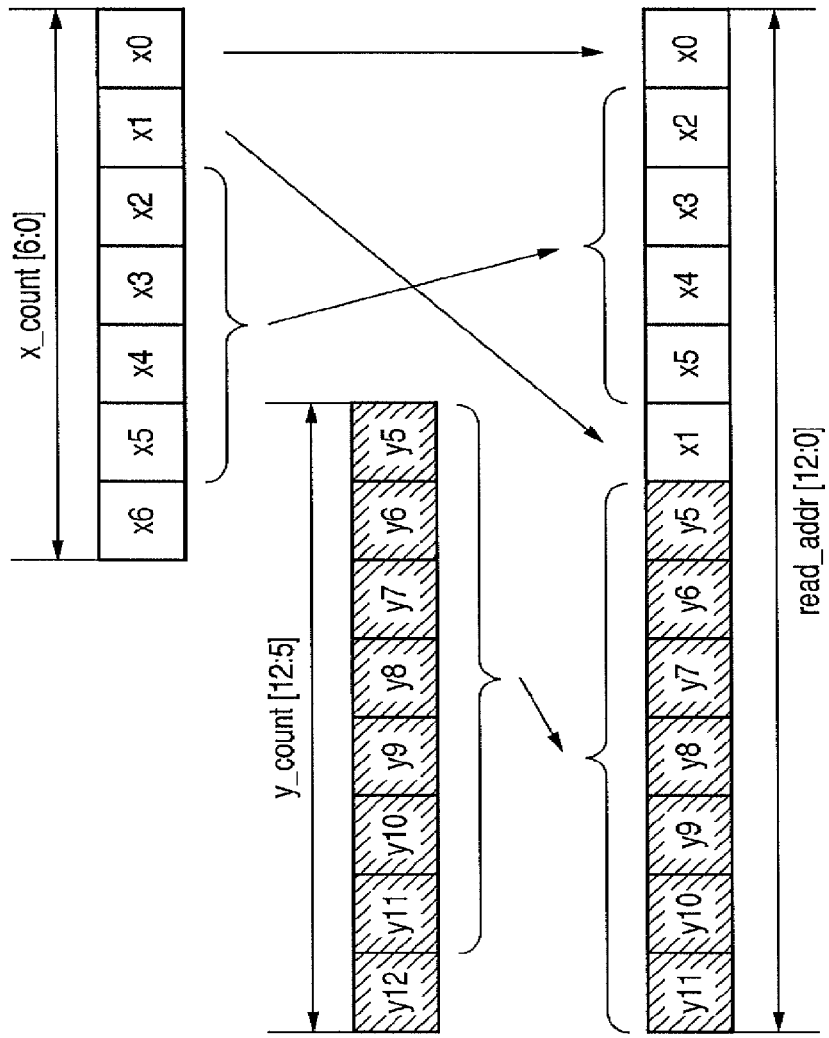
FIG. 8A is a diagram useful in describing an array conversion operation in an array converter according to the first embodiment.
Figure 8B:
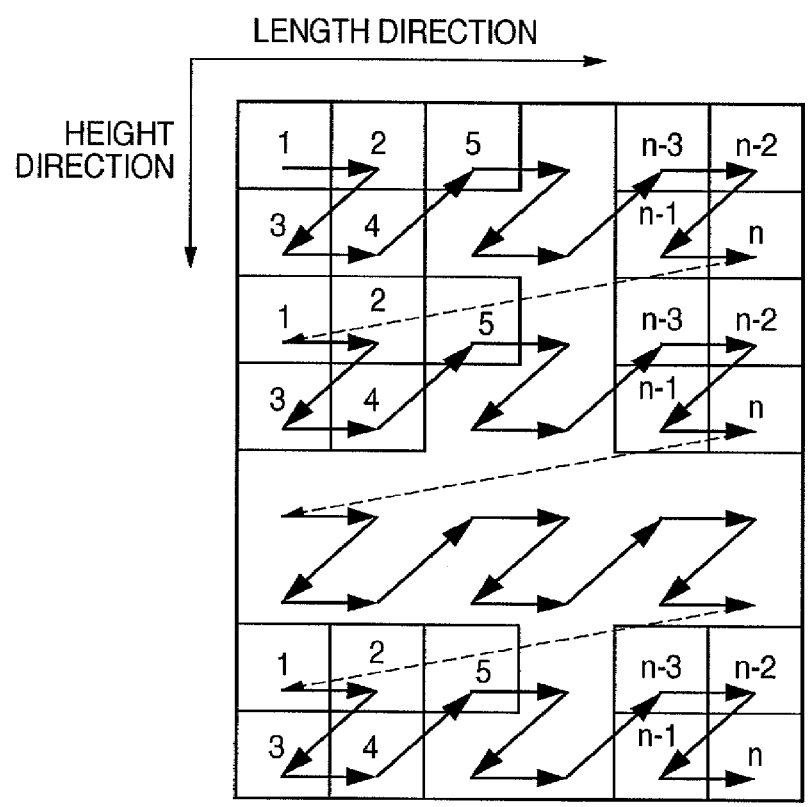
FIG. 8B is a diagram illustrating how the readout operation of FIG. 6B is converted by the array conversion operation of FIG. 8A.

In the case of the sensor structure of the first embodiment described above with reference to FIG. 4A, the image data is stored in the band memory 540 in the manner shown in FIG. 4B. Accordingly, the array converter 551 performs an array conversion of y_count_and x_count, as illustrated in FIG. 8A, and generates the readout address (read_addr[12:0]) of the band memory 540. At this time the sequence of data readout from the band memory 540 is as illustrated in FIG. 8B in a case where the length-direction counter 520 and height-direction counter 510 are driven by the method illustrated in FIG. 6A. That is, the readout sequence shown in FIG. 6B is changed to the sequence shown in FIG. 8B, and readout of pixel data from the band memory 540 is performed in accordance with this sequence.

Further, in a case where the length-direction counter 520 and height-direction counter 510 are driven by the method shown in FIG. 7A, the sequence of data readout from the band memory 540 becomes as shown in FIG. 8C. That is, the readout sequence shown in FIG. 7B is changed to the sequence shown in FIG. 8C, and readout of pixel data from the band memory 540 is performed in accordance with this sequence.

It should be noted that in a case where use is made of a sensor that has not been divided, 32 positions (0 to 4 bits) can be designated in the length direction and 256 positions (5 to 12 bits) can be designated in the height direction. On the other hand, in a case where there are two sensor outputs (division by 2), as in the present invention (FIG. 4A), a band that is twice as large in the length direction and half as large in the height direction can be handled in comparison with a case where use is made of a same-size band memory and a sensor that has not been divided. That is, FIG. 8A assumes a band memory having a band length of 64 pixels and a band height of 128 lines. Depending upon the memory size, however, other arrangements are possible.

Described above is a case where the CCD sensor 124 has a form (divided-by-two; two pixels) in which one line is divided into two lines and two consecutive pixels at a time are output successively from each line, as illustrated in FIG. 4A. The present invention is not limited to an output form of this kind, as a matter of course. It should be noted that the arrangement shown in FIG. 4A is suited to implementation of higher resolution with two identical sensors. In other words, resolution is doubled by staggering sensor block A and sensor block B by one-half pixel of the sensor pixel pitch. Since pixels for which the readout clocks are in phase tend to be multiplexed, the wiring that results is that of the sensor output units 411 and 412.

Figure 9A:
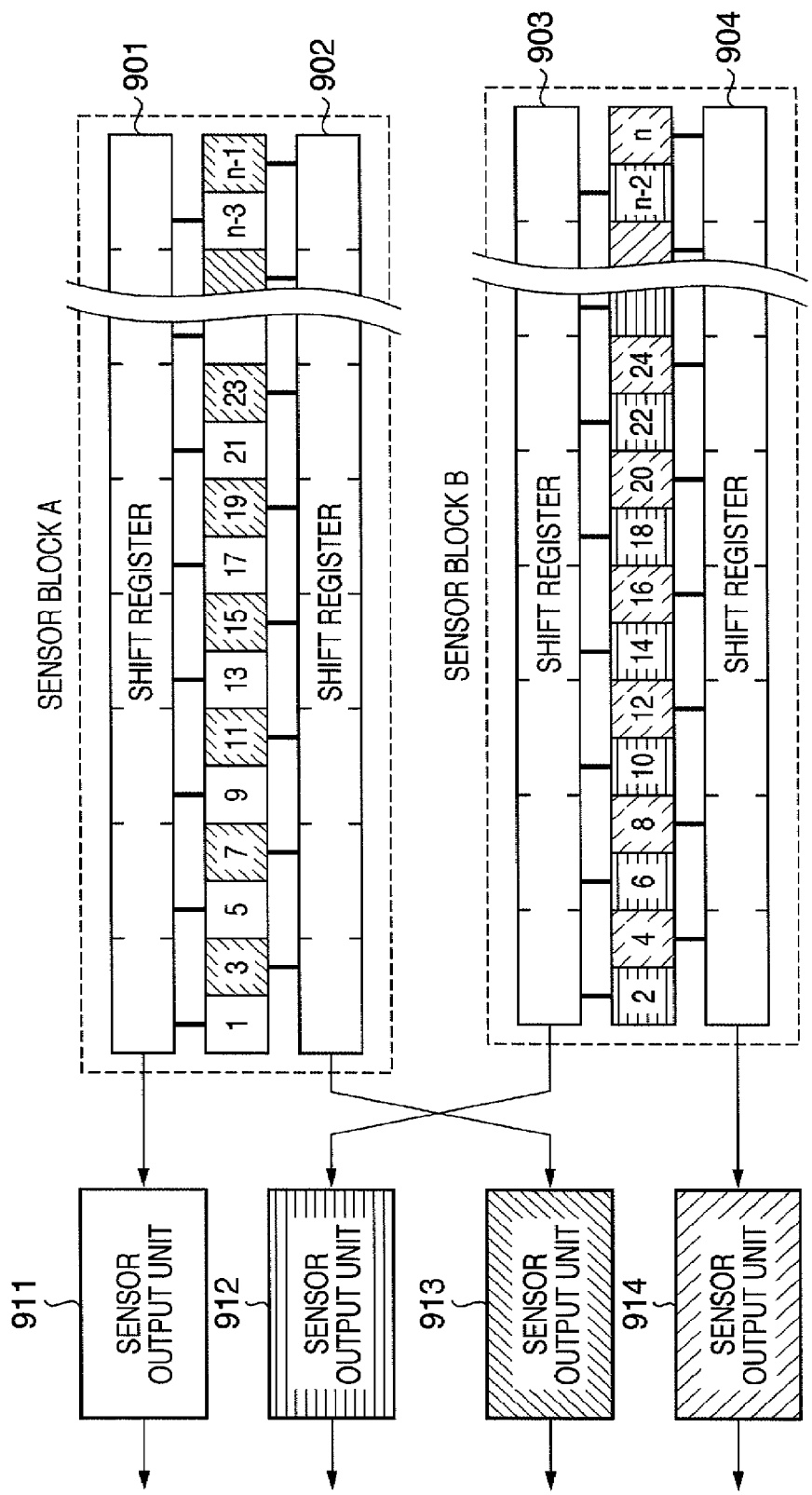
FIG. 9A is a diagram illustrating another example of the structure of a CCD sensor according to the first embodiment.
Figure 9B:
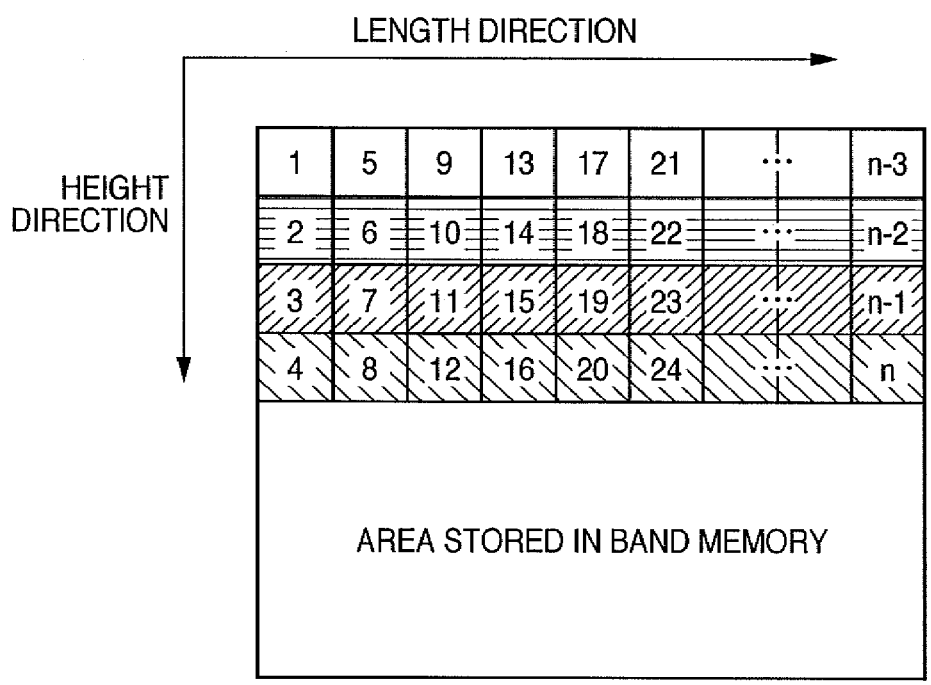
FIG. 9B is a diagram illustrating a state in which pixel data that has been output by the arrangement of FIG. 9A has been stored in a band memory.
Figure 9C:
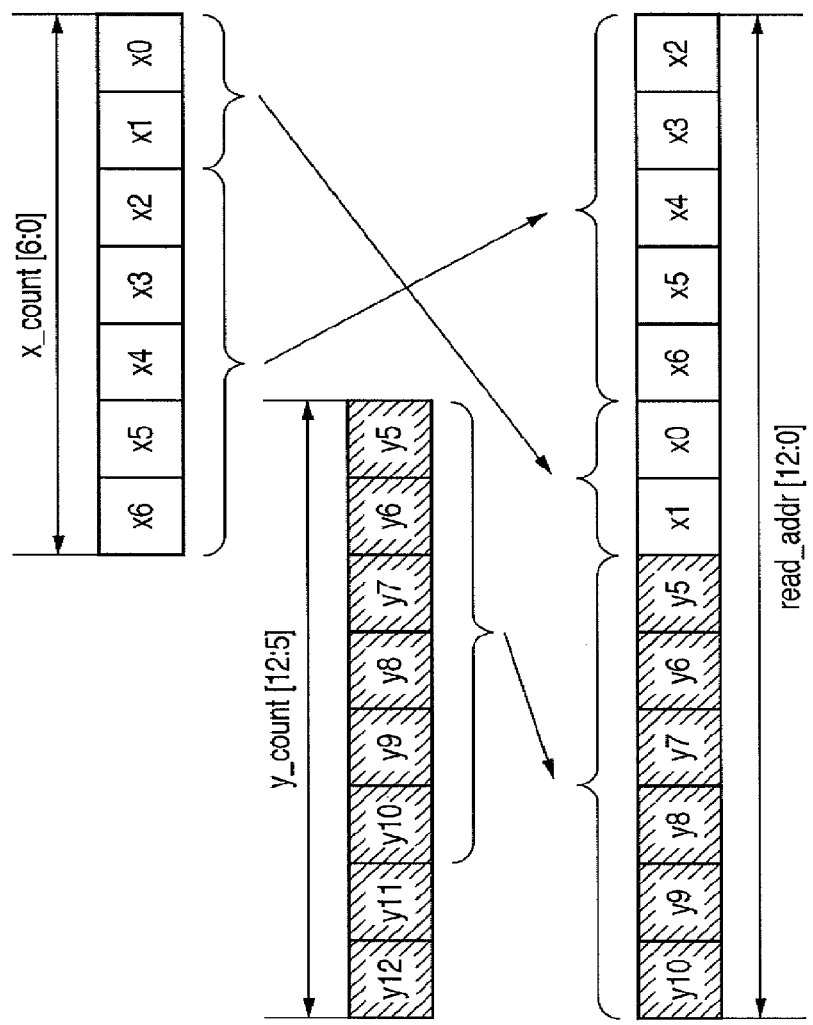
FIG. 9C is a diagram useful in describing another array conversion operation in an array converter according to the first embodiment.

Another example of the structure of CCD sensor 124 will be described below. FIG. 9A is a block diagram of the CCD sensor 124 in a case where shift registers 901 to 904 of the sensor blocks have sensor outputs 911 to 914. In the case of this sensor structure, image data that has been read is developed in the band memory in the manner depicted in FIG. 9B. The form of output illustrated in FIGS. 9A, 9B is one (divided-by-four; one pixel) in which one line is divided into four lines and one pixel at a time is output successively from each line. In a case where pixel data has been stored in the band memory 540 in the manner shown in FIG. 9B, it will suffice if the array conversion is performed in the array converter 551 in the manner illustrated in FIG. 9C. In accordance with this array converter 551, the readout sequence shown in FIG. 6B is converted to the readout sequence that is in accordance with the order of 1 to n in FIG. 9B, by way of example. Similarly, even in the readout sequence shown in FIG. 7B, the pixel data is read out by the array converter 551 band height at a time in an order that is in accordance with the order of 1 to n.

Generalization of the method of generating access addresses by the array converter 551 set forth above will now be described.

(1) First, the image reading unit 120 illustrated in FIGS. 4A, 4B and in FIGS. 9A, 9B is such that a plurality of sensor elements have line sensors (CCD sensors 124) arrayed in the line direction.

(2) The image reading unit 120 is such that one line of pixel signals acquired by the line sensor is divided into m lines (where m is an integer that is equal to or greater than 2) and signals are output successively in units of the divided lines. Here p continuous pixel signals (where p is an integer that is equal to or greater than 1) that have been extracted every other p×(m−1) pixels from one line of pixel signals are disposed in each divided line. For example, FIGS. 4A, 4B illustrate a case where m=2, p=2 holds, and FIGS. 9A, 9B illustrate a case where m=4, p=1 holds. The form in which a line is divided into m lines and p consecutive pixels at a time are placed on each line will be referred to as "divided-by-m; p pixels" below. For example, the form of the sensor output in FIG. 4A is "divided-by-two; two pixels", and the form of the sensor output in FIG. 9A is "divided-by-four; one pixel".

As illustrated in FIGS. 4B and 9B, pixel signals that have been output from the image reading unit 120 are stored in the band memory 540 in this output order by the write-address counter 530.

The length-direction counter 520 generates x_count_as an X-position signal comprising a plurality of bits. This indicates position in the X direction, which corresponds to the line direction, of the image obtained from the image reading unit 120. The height-direction counter 510 generates y_count_as a Y-position signal comprising a plurality of bits. This indicates position in the Y direction, which is perpendicular to the X direction, of the image obtained from the image reading unit 120. The bit array control circuit 550 rearranges the bit array of the X-position signal x_count_and combines this with the Y-position signal y_count, thereby generating the access address signal (read_addr) for accessing the band memory 540. In the input correction circuit 220, access to the band memory 540 is performed by the access address signal obtained by the above-mentioned address generation in the pixel rearranging circuit 500, a pixel signal is acquired and this is supplied to the sensor characteristic correction circuit 590, whereby prescribed image processing is applied.

The processing executed by the array converter 551 will now be described in greater detail in accordance with the foregoing embodiment.

(1) The array converter 551 extracts the number of bits necessary to express the numerical value of p×m−1 from the side of the least significant bit of the X-position signal x_count. For example, in both FIGS. 4A and 9A, two bits ($0^{th}$ bit and $1^{st}$ bit) necessary to express "3" are extracted.

(2) Remaining bits obtained by excluding the number of bits necessary to express the numerical value of p−1 from the extracted bits from the lower-order side thereof are connected to the least significant side of the Y-position signal y_count. In the case of the output format shown in FIG. 9A, "p−1=0" holds. Therefore, there are no excluded bits and the extracted two bits are connected as is to the least significant side of the Y-position signal y_count_(see FIG. 9C). In the case of the output format shown in FIG. 4A, "p−1=1" holds. Therefore, one lower-order bit (the $0^{th}$ bit) is excluded and the remaining bit (the $1^{st}$ bit) is connected to the least significant side of the Y-position signal y_count_(see FIG. 8A).

(3) The bit excluded in (2) above is connected to the least significant side of the X-position signal prevailing after bit extraction. For example, in the case of the output format of FIG. 4A, the $0^{th}$ bit excluded in (2) above is connected to the least significant side of the X-position signal obtained following the extraction of the two bits in (1) above (see FIG. 8A).

The readout operations of FIGS. 6B and 7B are converted respectively as shown in FIGS. 8B and 8C by the array conversion operation of FIG. 8A.

(4) Furthermore, in the case of one pixel and two consecutive access addresses, as in a case where one pixel is 16 bits (two bytes), 0 is connected to the least significant side of the access address generated in (3) above and leading addresses of successive access are generated. Further, in the case of one pixel and four consecutive access addresses, 0 is connected to the two bits on the least significant of the access address generated in (3) above and leading addresses of successive accesses are generated. It should be noted that in order to thus obtain an arrangement in which the number of bits of one pixel is capable of being selected in plural fashion, the unit of readout from the buffer memory is made to conform to a case where the number of bits of one pixel is maximized, and the necessary pixel data is selected by the bits on the least significant side. If this arrangement is adopted, the number of accesses will not change even if the number of bits of one pixel changes.

Accordingly, the sensor structure of the CCD sensor 124 to which the present invention is applicable is not limited to that described above. For example, if the shift registers 401, 402 are connected to the sensor output unit 411 and the shift registers 403, 404 are connected to the sensor output unit 412, then one pixel at a time is output sequentially from each line of the two lines. This form is referred to as "divided-by-two; one pixel". In this case, pixel data is stored in the band memory 540 in an arrangement of the kind shown in FIG. 10B.

FIGS. 10C and 10D illustrate arrangement of pixel data in the band memory 540 in a case where use is made of the sensor structures of FIGS. 4A and 9A, respectively. FIG. 10E illustrates arrangement of pixel data in the band memory 540 based upon the form "divided-by-four; two pixels" in which two pixels at a time area output successively from four lines (the sensor structure in this case is not illustrated). FIG. 10A illustrates arrangement of pixel data in the band memory 540 in a case line division is not performed.

FIGS. 11A to 11J illustrate examples of conversion of bit arrangements by the array converter 551 corresponding to the sensor structures mentioned above.

FIGS. 11A to 11E illustrate examples of conversion of bit arrangements corresponding to the arrangements of pixel data illustrated in FIGS. 10A to 10E, respectively. It should be noted that FIGS. 11A to 11E are for a case where the data size of one pixel is eight bits. On the other hand, the FIGS. 11F to 11J are for a case where the data size of one pixel is 16 bits. In a case where the data size of one pixel is 16 bits, a portion equivalent to two addresses of the buffer memory is occupied by one pixel. Accordingly, readout is always performed in units of two addresses and 0 is always assigned to the least significant bit (read_addr0]) of the address. That is, the array converter 551, after performing an array conversion in the manner shown in FIGS. 11B to 11E, inserts 0 as the least significant bit and shifts bits 0 to 3 to bits 1 to 4.

In accordance with a command from the CPU 112, the array converter 551 of this embodiment is capable of selectively executing an array conversion of the kind shown in FIGS. 11A to 11J above. That is, using a parameter that has been stored in the external storage unit 118, etc., the CPU 112 instructs the bit array control circuit 550 of the operating mode of the array converter 551 and can change over the type of array conversion. Accordingly, pixel rearrangements corresponding to various types of sensor structures can be implemented in one and the same image processing system.

In accordance with the first embodiment, as described above, pixel data is stored sequentially in a pixel-data memory (band memory) in the form of the array that entered from the CCD sensor 124. A first counter that indicates pixel position (x_count) in the length direction (main-scan direction) and a second counter that indicates pixel position (y_count) in the height direction (sub-scan direction) designate a pixel position that prevails following reconstruction of the image to be read out. The bit array control circuit 550 makes a conversion to a readout address of the band memory 540 corresponding to the pixel position designated by x_count_and y_count. By performing readout from the band memory 540 according to this readout address, the image data is rearranged and desired image data can be obtained. Further, it is possible to deal with a plurality of dividing modes of a scanner in simple fashion.

Second Embodiment

A second embodiment will now be described. There are cases where, depending upon the circumstances of assembly of the CCD sensor 124 or image reading range, the ends of the sensor cannot be used and readout is performed from a pixel position that is not at the boundary of sensor division. For example, in the sensor structure shown in FIG. 4A, there are cases where the first sensor element of sensor block A cannot be used and pixel data is output from the shift register 401 with the fourth pixel serving as the beginning In such cases a phase shift develops in the output from shift register A and pixel data is stored in the band memory 540 in the arrangement shown in FIG. 12B. Further, in a case where there is a shift of one pixel in the "divided-by-two; one pixel" arrangement, the pixel data is arranged as shown in FIG. 12A. Similarly, in a case where there is a shift of two pixels in the "divided-by-four; one pixel" arrangement, the pixel data is arranged as shown in FIG. 12C, and in a case where there is a shift of four pixels in the "divided-by-four; two pixels" arrangement, the pixel data is arranged as shown in FIG. 12D.

In this case, it is necessary to read out the images in the order of the numerals shown in FIGS. 12A to 12D. With the pixel rearranging circuit 500 described in the second embodiment, even if there is a shift in phase, the phase shift can be compensated for and image data can be rearranged correctly without arranging pixels, which have been developed in the band memory 540, in the manner illustrated in the first embodiment. It should be noted that the phase compensation in the second embodiment is for dealing with a case where pixels have been shifted in units of p pixels in a sensor of the "divided-by-m; p pixels" arrangement.

Figure 13:
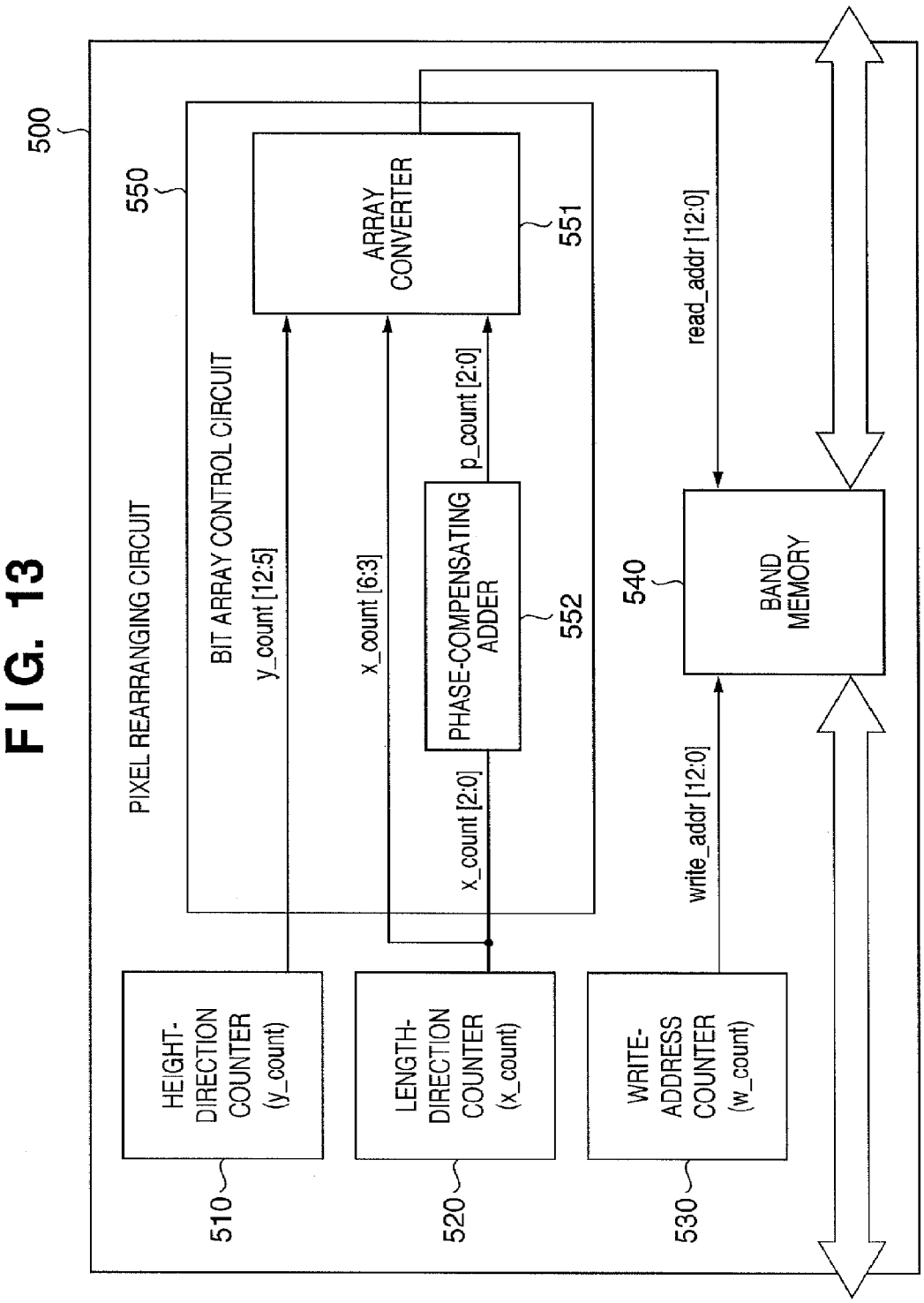
FIG. 13 is a block diagram illustrating the configuration of a pixel rearranging circuit according to a second embodiment of the present invention.

FIG. 13 is a block diagram illustrating the configuration of the pixel rearranging circuit 500 according to a second embodiment.

As shown in FIG. 13, the three lower-order bits (x_count [2:0]) of the output of length-direction counter 520 are connected to a phase-compensating adder 552 in the bit array control circuit 550 of the first embodiment. The output (p_count[2:0]) of the phase-compensating adder 552 is connected to the array converter 551. The phase-compensating adder 552 is a circuit for adding on a designated offset value in accordance with the operating mode of the array converter 551. The range of bits added on by the phase-compensating adder 552 is decided by the operating mode, and the offset value is designated by a parameter stored in the external storage unit 118, etc. The CPU 112 instructs the bit array control circuit 550 of these items.

As illustrated in FIGS. 11A to 11J, the pixel rearranging circuit 500 moves some of the bits of the bit array of the output (X-position signal) from length-direction counter 520 to the higher-order side and couples the height-direction counter 510 (Y-position signal) to the higher-order side of the X-position signal. An access address signal suited to the band memory is generated by this operation. In order to read out pixels in the order illustrated in FIGS. 12A to 12D owing to occurrence of the pixel shift mentioned above, the phase-compensating adder 552 performs addition with the target being the output bits of the length-direction counter 520 moved to the most significant side of the X position (the side of the Y-position signal). More specifically, addition is performed as follows:

in case of "divided-by-two; one pixel", 1 is added to x_count0:0] moved to the side of the Y-position signal (the most significant side);

in case of "divided-by-two; two pixels", 1 is added to x_count[1:1] moved to the side of the Y-position signal (the most significant side);

in case of "divided-by-four; one pixel", any one of 1 to 3 is added to x_count[1:0] moved to the side of the Y-position signal (the most significant side) (2 is added in FIG. 12C); and in case of "divided-by-four; two pixels", any one of 1 to 3 is added to x_count[2:1] moved to the side of the Y-position signal (the most significant side) (2 is added in the above-described figure).

Figure 11A:
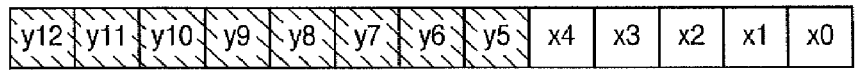
FIGS. 11A to 11J are diagrams illustrating operating modes of a bit array control circuit according to the embodiment.
Figure 11B:
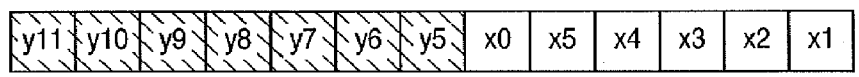
Figure 11C:
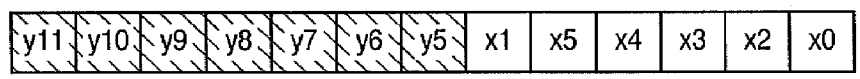
Figure 11D:
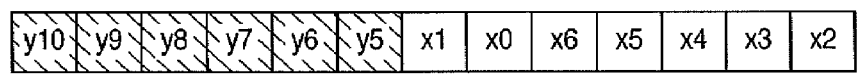
Figure 11E:
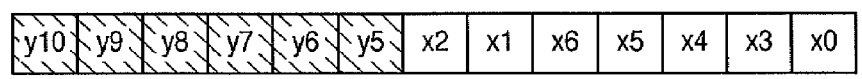
Figure 11F:
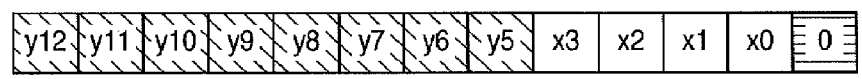
Figure 11G:
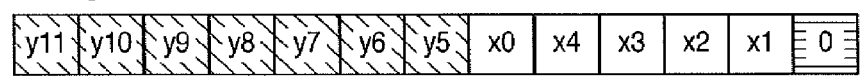
Figure 11H:
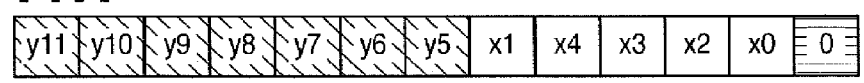
Figure 11I:
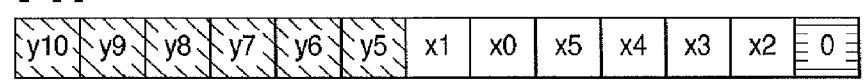
Figure 11J:
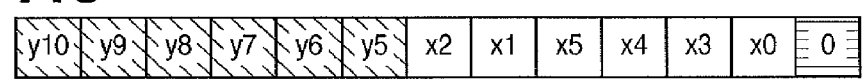

Accordingly, if the operating mode is that of FIG. 11B or 11G, the arrangement is the "divided-by-two; one pixel" arrangement and therefore the phase-compensating adder 552 performs offset addition with regard to one bit of the least significant one bit x_count0:0]. In the case of FIGS. 11C and 11H, the arrangement is the "divided-by-two; two pixels" arrangement and therefore the phase-compensating adder 552 performs offset addition with regard to one bit of x_count [1:1]. In the case of FIGS. 11D and 11I, the arrangement is the "divided-by-four; one pixel" arrangement and therefore the phase-compensating adder 552 performs offset addition with regard to two bits of x_count[1:0]. In the case of FIGS. 11E and 11J, the arrangement is the "divided-by-four; two pixels" arrangement and therefore the phase-compensating adder 552 performs offset addition with regard to two bits of x_count[2:1]. It should be noted that a carry produced by addition is ignored in the phase-compensating adder 552.

As mentioned above, the bit array control circuit of the second embodiment has the phase-compensating adder 552 for performing phase compensation before the bit array is rearranged by the array converter 551. The phase-compensating adder 552 performs phase-compensating addition with respect to bits that are the target for movement to the most significant side (the side of connection to the Y-position signal) in the bit array of the X-position signal (x_count). The value added is an integral value selected from among numerical values within a range capable of being expressed by the number of bits that are the target of movement. For example, in the case where the form of the sensor output is "divided-by-four; two pixels", phase is compensated for by adding any integral value of 0 to 3 capable of being expressed by two bits to the range of two bits of x_count[2:1] that is the target of movement.

In accordance with the second embodiment described above, an address for reading pixel data, which corresponds to any pixel position in a band area, from the band memory 540 is generated by the bit array control circuit 550. Accordingly, the order of pixel positions designated by the height-direction counter 510 and length-direction counter 520 is not limited to that described above; pixel positions can be designated in any order.

Further, it may be so arranged that the operation of the array converter 551 or phase-compensating adder 552 can be set by a jumper or by a command from the CPU 112 so as to make it possible to deal with divided readout of a plurality of types or with a phase shift. If such an arrangement is adopted, a common pixel rearranging circuit 500 can be utilized in image reading units 120 having different forms of divided readout or different phase differences.

Thus, in accordance with the foregoing embodiments, even if output from a sensor is stored in a band memory in a form divided according to the array of sensor elements, a correct pixel signal can be obtained from the band memory in accordance with readout by an image processing unit at the time of readout in the sub-scan direction in band units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image data combining apparatus for combining m lines (where m is an integer equal to or greater than 2) of pixel data that have been output from a reading unit, wherein the reading unit has at least one line sensor that divides a portion of the image data into m lines of pixel data and outputs the m lines of pixel data into a memory that has a width direction and a height direction, such that each of the m lines is stored in the width direction, said apparatus comprising:
   an access unit configured to access the memory; and
   a determination unit configured to determine an upper address used for accessing the memory by said access unit, based upon first data that relates a position, along the height direction, of the m lines of pixel data stored in the memory, and to determine a lower address used for accessing the memory by said access unit, based upon second data that relates a position of the width direction in the m lines of pixel data stored in the memory,
   wherein the lower address includes values in which a portion of a plurality of bits constituting the second data are interchanged in such a manner that when the first data and the second data increase sequentially, p items (where p is an integer equal to or greater than 1) of pixel data output from each of the m lines of pixel data will be extracted from the memory each time, and such extraction is performed successively.

2. The apparatus according to claim 1, wherein the lower address includes values in which one or more first bits and one or more second bits of the second data are interchanged,
   the one or more first bits is a bit or are bits obtained by removing the number of bits necessary to represent the numerical value p−1 from the bits that are obtained by extracting the number of bits necessary to represent a numerical value p×m−1 from a least significant side of the second data, and
   the one or more second bits is a bit or are bits obtained by removing, from the second data, the number of bits necessary to represent the numerical value p×m−1 from a least significant side of the second data.

3. The apparatus according to claim 1, wherein, if there are two successive accesses, then one bit having a value of zero is connected to the lower address on a lower-order side of the plurality of bits constituting the second data, and if there are four successive accesses, then two bits having a value of zero are connected to the lower address on the lower-order side of the plurality of bits constituting the second data.

4. The apparatus according to claim 1, wherein, with respect to specific bits that are interchanged among the plurality of bits constituting the second data, an integral value selected from among numerical values within a range capable of being represented by the number of bits of the specific bits is added to the lower address.

5. The apparatus according to claim 1, wherein the reading unit has N line sensors arranged in parallel, and the N line sensors are disposed at a pitch of φ=d/N in a main-scan direction, where d represents the distance between centers of neighboring pixels within the N line sensors.

6. An image data combining method for combining m lines (where m is an integer equal to or greater than 2) of pixel data that have been output from a reading unit, wherein the reading unit has at least one line sensor that divides a portion of the image data into m lines of pixel data and outputs the m lines of pixel data into a memory that has a width direction and a height direction, such that each of the m lines is stored in the width direction, said method comprising:
   an access step of accessing the memory; and
   a determination step of determining an upper address used for accessing the memory in said access step, based upon first data that relates a position, along the height direction, of the m lines of pixel data stored in the memory, and determining a lower address used for accessing the memory in said access step, based upon second data that relates a position of the width direction in the m lines of pixel data stored in the memory,
   wherein the lower address includes values in which a portion of a plurality of bits constituting the second data is interchanged in such a manner that p items (where p is an integer equal to or greater than 1) of pixel data at a time are extracted successively from each of the m lines of pixel data.

7. The method according to claim 6, wherein the lower address includes values in which one or more first bits and one or more second bits of the second data are interchanged,
   the one or more first bits is a bit or are bits obtained by removing the number of bits necessary to represent the numerical value p−1 from the bits that are obtained by extracting the number of bits necessary to represent a numerical value p×m−1 from a least significant side of the second data, and the one or more second bits is a bit or are bits obtained by removing, from the second data, the number of bits necessary to represent the numerical value p×m−1 from the least significant side of the second data.

8. The method according to claim 6, wherein, if there are two successive accesses, then one bit having a value of zero is connected to the lower address on a lower-order side of the plurality of bits constituting the second data, and if there are four successive accesses, then two bits having a value of zero are connected to the lower address on the lower-order side of the plurality of bits constituting the second data.

9. The method according to claim 6, wherein, with respect to specific bits that are interchanged among the plurality of bits constituting the second data, an integral value selected from among numerical values within a range capable of being represented by the number of bits of the specific bits is added to the lower address.

10. An image data processing apparatus for arranging m groups (where m is an integer equal to or greater than 2) of pixel data that have been output from a reading unit and outputting arranged image data, wherein the reading unit has at least one line sensor and divides at least one line of image data into m groups of image data and outputs the m groups, and consecutive p pixels that have been extracted from every p×m pixels (where p is an integer equal to or greater than 1) are arranged as each of the m groups of pixel data, said apparatus comprising:
 a memory unit configured to store the m groups of pixel data output by the reading unit;
 an acquiring unit configured to acquire first data and second data, wherein the first data and the second data increase sequentially;
 a generation unit configured to generate an address for accessing said memory unit, wherein the address includes values in which a portion of a lower bit of the second data is moved to an upper side and a portion of the first data locates the upper side of the portion of the lower bit of the second data, and
 an access unit configured to access said memory unit by using the address generated in said generation unit in such a manner that p items (where p is an integer equal to or greater than 1) of pixel data output from each of m groups of pixel data extracted from said memory unit will be successively arranged as an image.

11. An image data processing method for arranging m groups (where m is an integer equal to or greater than 2) of pixel data that have been output from a reading unit and outputting arranged image data, wherein the reading unit has at least one line sensor and divides at least one line of image data into m groups of image data and outputs the m groups, consecutive p pixels that have been extracted from every p×m pixels (where p is an integer equal to or greater than 1) are arranged as each of the m groups of pixel data, and a plurality of pixel data in each of the m groups are stored in a memory unit, said method comprising the steps of:
 acquiring first data and second data, wherein the first data and the second data increase sequentially;
 generating an address for accessing the memory unit, wherein the address includes values in which a portion of a lower bit of the second data is moved to an upper side and a portion of the first data locates the upper side of the portion of the lower bit of the second data; and
 accessing the memory unit by using the address generated in said generating step in such a manner that consecutive p pixels output from each of m groups of pixel data extracted from the memory unit will be successively arranged as an image.

12. The apparatus according to claim 10, wherein a lower address of the address that is generated by said generation unit includes values in which one or more first bits and one or more second bits of the second data are interchanged,
 the one or more first bits is a bit or are bits obtained by removing the number of bits necessary to represent the numerical value p−1 from the bits that are obtained by extracting the number of bits necessary to represent a numerical value p×m−1 from a least significant side of the second data, and
 the one or more second bits is a bit or are bits obtained by removing, from the second data, the number of bits necessary to represent the numerical value p×m− from the least significant side of the second data.

13. The apparatus according to claim 10, wherein, if there are two successive accesses, then one bit having a value of zero is connected to the lower address on a lower-order side of a plurality of bits constituting the second data, and if there are four successive accesses, then two bits having a value of zero are connected to the lower address on the lower-order side of the plurality of bits constituting the second data.

14. The apparatus according to claim 10, wherein, with respect to specific bits that are interchanged among a plurality of bits constituting the second data, an integral value selected from among numerical values within a range capable of being represented by the number of bits of the specific bits is added to the lower address.

15. The apparatus according to claim 10, wherein the reading unit has N line sensors arranged in parallel, and the N line sensors are disposed at a pitch of $\phi=d/N$ in a second direction, where d represents the distance between centers of neighboring pixels within the N line sensors.

16. The apparatus according to claim 10, wherein said generation unit is configured to generate an upper address used for accessing said memory unit by said access unit, based upon first data that relates a position, along a first direction, of the m groups of pixel data stored in said memory unit, and to determine a lower address used for accessing said memory unit by said access unit, based upon second data that relates a position of a second direction in the m groups of pixel data stored in said memory unit.

17. The apparatus according to claim 10, wherein the address for accessing said memory unit is generated based on a parameter stored in an external storage apparatus.

18. An image data processing system comprising:
 a reading unit configured to output m groups (where m is an integer equal to or greater than 2) of pixel data, said reading unit having at least one line sensor and dividing at least one line of an image data into m groups of image data and outputting the m groups, wherein consecutive p pixels that have been extracted from every p×m pixels (where p is an integer equal to or greater than 1) are disposed as the m groups of pixel data;
 a memory unit configured to store the m groups of pixel data output by said reading unit;
 an acquiring unit configured to acquire first data and second data, wherein the first data and the second data increase sequentially;
 a generation unit configured to generate an address for accessing said memory unit, wherein the address includes values in which a portion of a lower bit of the second data is moved to an upper side and a portion of the first data locates the upper side of the portion of the lower bit of the second data; and an access unit configured to access said memory unit by using the address generated in said generation unit in such a manner that p items (where p is an integer equal to or greater than 1) of pixel data output from each of m groups of pixel data extracted from said memory unit will be successively arranged as an image.

19. An image data processing apparatus for arranging m lines (where m is an integer equal to or greater than 2) of pixel data that have been output from a reading unit and outputting arranged image data, wherein the reading unit has at least one line sensor and divides at least one line of image data into m lines of image data and outputs the m lines, and consecutive p pixels that have been extracted from every p×m pixels (where p is an integer equal to or greater than 1) are arranged as each of the m lines of pixel data, said apparatus comprising:

a memory unit configured to store the m lines of pixel data output by the reading unit;

an acquiring unit configured to acquire parameters for generating an address by using first data and second data, the first data relating a position, along a first direction, of the m lines of pixel data stored in the memory unit, and the second data relating a position, along a second direction, of the m lines of pixel data stored in the memory unit, wherein the address comprises an upper address and a lower address and the first data and the second data increase sequentially;

a generation unit configured to generate the address comprising the upper address and the lower address for accessing said memory unit based on the parameters, wherein the upper address used for accessing said memory unit along the first direction of the data stored in said memory unit is generated using a portion of the first data and a portion of the second data and the lower address used for accessing said memory unit along the second direction of the data stored in said memory unit is generated using data with the exception of the portion of the second data used in the upper address from the second data; and an access unit configured to access said memory unit by using the address generated in said generation unit in such a manner that pixel data acquired by accessing said memory unit will be successively arranged as an image.

20. An image data processing method for arranging m lines (where m is an integer equal to or greater than 2) of pixel data that have been output from a reading unit and outputting arranged image data, wherein the reading unit has at least one line sensor and divides at least one line of image data into m lines of image data and outputs the m groups, consecutive p pixels that have been extracted from every p×m pixels (where p is an integer equal to or greater than 1) are arranged as each of the m lines of pixel data, and the m lines of pixel data output by the reading unit are stored in a memory unit, said method comprising the steps of:

acquiring parameters for generating an address by using first data and second data, the first data relating a position, along a first direction, of the m lines of pixel data stored in the memory unit, and the second data relating a position, along a second direction, of the m lines of pixel data stored in the memory unit, wherein the address comprises an upper address and a lower address, and the first data and the second data increase sequentially;

generating the address comprising the upper address and the lower address for accessing the memory unit based on the parameters, wherein the upper address used for accessing the memory unit along the first direction of the data stored in the memory unit is generated using a portion of the first data and a portion of the second data, and the lower address used for accessing the memory unit along the second direction of the data stored in the memory unit is generated using data with the exception of the portion of the second data used in the upper address from the second data; and accessing the memory unit by using the address generated in the generating step in such a manner that pixel data acquired by accessing the memory unit will be successively arranged as an image.

21. An image data processing system comprising:

a reading unit configured to output m lines (where m is an integer equal to or greater than 2) of pixel data, wherein the reading unit has at least one line sensor and divides at least one line of an image data into m lines of image data and outputs the m lines, and consecutive p pixels that have been extracted from every p×m pixels (where p is an integer equal to or greater than 1) are disposed as the m lines of pixel data;

a memory unit configured to store the m lines of pixel data output by said reading unit;

an acquiring unit configured to acquire parameters for generating an address by using first data and second data, the first data relating a position, along a first direction, of the m lines of pixel data stored in the memory unit, and the second data relating a position, along a second direction, of the m lines of pixel data stored in the memory unit, wherein the address comprises an upper address and a lower address, and the first data and the second data increase sequentially;

a generation unit configured to generate the address comprising the upper address and the lower address for accessing said memory unit based on the parameters, wherein the upper address used for accessing said memory unit along the first direction of the data stored in said memory unit is generated using a portion of the first data and a portion of the second data, and the lower address used for accessing said memory unit along the second direction of the data stored in said memory unit is generated using data with the exception of the portion of the second data used in the upper address from the second data; and an access unit configured to access said memory unit by using the address generated in said generation unit in such a manner that pixel data acquired by accessing said memory unit will be successively arranged as an image.

22. The apparatus according to claim 19, wherein the lower address generated by said generation unit includes values in which one or more first bits and one or more second bits of the second data are interchanged, the one or more first bits is a bit or are bits obtained by removing the number of bits necessary to represent the numerical value p−1 from the bits that are obtained by extracting the number of bits necessary to represent a numerical value p×m 1 from a least significant side of the second data, and the one or more second bits is a bit or are bits obtained by removing, from the second data, the number of bits necessary to represent the numerical value p×m−1 from the least significant side of the second data.

23. The apparatus according to claim 22, wherein, if there are two successive accesses, then one bit having a value of zero is connected to the lower address on a lower-order side of a plurality of bits constituting the second data, and if there are four successive accesses, then two bits having a value of zero are connected to the lower address on the lower-order side of the plurality of bits constituting the second data.

24. The apparatus according to claim 22, wherein, with respect to specific bits that are interchanged among a plurality of bits constituting the second data, an integral value selected from among numerical values within a range capable of being represented by the number of bits of the specific bits is added to the lower address.

25. The apparatus according to claim 19, wherein the reading unit has N line sensors arranged in parallel, and the N line sensors are disposed at a pitch of $\phi=d/N$ in a second direction, where d represents the distance between centers of neighboring pixels within the N line sensors.

26. The apparatus according to claim 19, wherein the address for accessing said memory unit is generated based on a parameter stored in an external storage apparatus.

* * * * *